US012266487B2

(12) United States Patent
Rhein et al.

(10) Patent No.: US 12,266,487 B2
(45) **Date of Patent: *Apr. 1, 2025**

(54) SYSTEM AND METHOD FOR OPERATING AN ELECTRICAL SWITCH

(71) Applicant: Hubbell Incorporated, Shelton, CT (US)

(72) Inventors: David Adelbert Rhein, Birmingham, AL (US); Cong Thanh Dinh, Birmingham, AL (US)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/092,057

(22) Filed: Dec. 30, 2022

(65) Prior Publication Data

US 2024/0222052 A1 Jul. 4, 2024

Related U.S. Application Data

(63) Continuation of application No. 17/218,988, filed on Mar. 31, 2021, now Pat. No. 11,545,321.

(Continued)

(51) Int. Cl.

*H01H 33/02* (2006.01)
*H01H 33/66* (2006.01)
*H01H 33/664* (2006.01)

(52) U.S. Cl.

CPC .......... *H01H 33/025* (2013.01); *H01H 33/66* (2013.01); *H01H 33/664* (2013.01)

(58) Field of Classification Search

CPC ...... H01H 33/664; H01H 33/66; H01H 33/02; H01H 33/025; H01H 33/126;

(Continued)

(56) References Cited

U.S. PATENT DOCUMENTS 2,480,622 A 8/1949 Warnock
2,979,587 A 4/1961 Jennings (Continued)

FOREIGN PATENT DOCUMENTS

DE 19517287 11/1996
DE 102013224834 A1 6/2015

(Continued)

OTHER PUBLICATIONS

PCT/US2021/025155 International Search Report and Written Opinion dated Jul. 9, 2021 (11 pages).

(Continued)

*Primary Examiner* — William A Bolton
(74) *Attorney, Agent, or Firm* — Michael Best & Friedrich LLP

(57) ABSTRACT

A switch including a first electrical terminal, the first electrical terminal including a blade pivotable between an open position and a closed position, and a rod extending from the first electrical terminal parallel to the blade. The switch further includes a second electrical terminal configured to receive the blade when in the closed position, the second electrical terminal including a vacuum interrupter, wherein the vacuum interrupter engages the rod when in the closed position. Rotating the first electrical terminal in a first direction causes the blade to disengage from the second electrical terminal at a first point, and further rotating the first electrical terminal in the first direction causes the rod to disengage from the vacuum interrupter at a second point.

3 Claims, 25 Drawing Sheets

Related U.S. Application Data

(60) Provisional application No. 63/002,509, filed on Mar. 31, 2020.

(58) Field of Classification Search
CPC .... H01H 33/122; H01H 33/124; H01H 31/28; H01H 31/30; H01H 2031/286; H01H 1/52
USPC ..... 218/118, 8, 12, 10, 14; 200/48 KB, 146, 200/275, 288
See application file for complete search history.

(56) References Cited

U.S. PATENT DOCUMENTS

| | | | | | |
|---|---|---|---|---|---|
| 3,227,925 | A * | 1/1966 | Cook | H01H 33/128 200/61.19 |
| 3,522,404 | A | 8/1970 | Trayer | |
| 3,566,061 | A * | 2/1971 | Bernatt | H01H 33/16 338/215 |
| 3,671,696 | A | 6/1972 | Brunner | |
| 3,727,018 | A | 4/1973 | Wesoloski | |
| 3,769,477 | A | 10/1973 | Chabala et al. | |
| 3,813,506 | A | 5/1974 | Mitchell | |
| 3,814,885 | A | 6/1974 | Sofianek | |
| 3,824,359 | A | 7/1974 | Date | |
| 3,839,612 | A | 10/1974 | Badey | |
| 4,049,936 | A * | 9/1977 | Frink | H01H 3/30 200/48 R |
| 4,070,558 | A | 1/1978 | Stewart | |
| 4,086,461 | A | 4/1978 | Gonek | |
| 4,110,579 | A | 8/1978 | Frink et al. | |
| 4,115,672 | A | 9/1978 | Lipperts | |
| 4,124,790 | A | 11/1978 | Kumbera et al. | |
| 4,174,053 | A | 11/1979 | Shimizu | |
| 4,323,871 | A | 4/1982 | Kamp et al. | |
| 4,381,435 | A | 4/1983 | Barkan | |
| 4,492,835 | A | 1/1985 | Turner | |
| 4,503,411 | A | 3/1985 | Lofstrand | |
| 4,506,121 | A | 3/1985 | Peterson et al. | |
| 4,527,028 | A | 7/1985 | Luehring | |
| 4,562,506 | A | 12/1985 | Moran | |
| 4,568,804 | A | 2/1986 | Luehring | |
| 4,591,678 | A | 5/1986 | Yin | |
| 4,618,749 | A | 10/1986 | Bohme | |
| 4,625,189 | A | 11/1986 | Lazar et al. | |
| 4,677,262 | A | 6/1987 | Ramos et al. | |
| 4,680,706 | A | 7/1987 | Bray | |
| 4,797,777 | A | 1/1989 | Beard | |
| 4,798,921 | A | 1/1989 | Watanabe | |
| 4,839,481 | A | 6/1989 | Nash et al. | |
| 4,879,441 | A | 11/1989 | Hamm et al. | |
| 4,935,712 | A | 6/1990 | Oyama et al. | |
| 4,935,715 | A | 6/1990 | Popeck | |
| 5,055,640 | A | 10/1991 | Lippi et al. | |
| 5,099,382 | A | 3/1992 | Eppinger | |
| 5,103,364 | A | 4/1992 | Kamp et al. | |
| 5,117,325 | A | 5/1992 | Dunk et al. | |
| 5,124,678 | A | 6/1992 | Yamat et al. | |
| 5,175,403 | A | 12/1992 | Hamm et al. | |
| 5,191,180 | A | 3/1993 | Kitamura | |
| 5,206,616 | A | 4/1993 | Stegmuller | |
| 5,387,772 | A | 2/1995 | Bestel | |
| 5,388,451 | A | 2/1995 | Stendin | |
| 5,422,450 | A | 6/1995 | Miyazawa | |
| 5,452,172 | A | 9/1995 | Lane et al. | |
| 5,497,096 | A | 3/1996 | Banting et al. | |
| 5,521,348 | A | 5/1996 | Berndt et al. | |
| 5,589,675 | A | 12/1996 | Walters et al. | |
| 5,597,992 | A | 1/1997 | Walker | |
| 5,663,712 | A | 9/1997 | Kamp et al. | |
| 5,729,888 | A | 3/1998 | Abdelgawad et al. | |
| 5,747,766 | A | 5/1998 | Waino et al. | |
| 5,808,258 | A | 9/1998 | Luzzi | |
| 5,859,398 | A | 1/1999 | McKean | |
| 5,864,108 | A | 1/1999 | Rohling et al. | |
| 5,912,604 | A | 6/1999 | Harvey et al. | |
| 5,917,167 | A | 6/1999 | Bestel | |
| 5,952,635 | A | 9/1999 | Plat | |
| 6,020,567 | A | 2/2000 | Ishikawa et al. | |
| 6,144,005 | A | 11/2000 | Tanimizu et al. | |
| 6,172,317 | B1 | 1/2001 | Wristen | |
| 6,198,062 | B1 | 3/2001 | Mather et al. | |
| 6,242,708 | B1 | 6/2001 | Marchand et al. | |
| 6,373,015 | B1 | 4/2002 | Marchand et al. | |
| 6,696,658 | B2 | 2/2004 | Kowalyshen et al. | |
| 6,753,493 | B2 | 6/2004 | Rhein et al. | |
| 6,888,086 | B2 | 5/2005 | Daharsh et al. | |
| 6,927,356 | B2 | 8/2005 | Sato | |
| 8,729,416 | B2 | 5/2014 | Bullock et al. | |
| 9,761,394 | B2 | 9/2017 | Rhein | |
| 9,899,166 | B1 | 2/2018 | Shychuck et al. | |
| 10,148,081 | B2 * | 12/2018 | Rhein | H01H 33/124 |
| 10,672,575 | B2 | 6/2020 | Rhein et al. | |
| 11,024,477 | B2 | 6/2021 | Rhein et al. | |
| 2002/0066655 | A1 * | 6/2002 | Theaudiere | H01H 9/104 200/47 |
| 2006/0266630 | A1 | 11/2006 | Stepniak | |
| 2009/0084762 | A1 | 4/2009 | Wristen et al. | |
| 2010/0000972 | A1 | 1/2010 | Bodenstein | |
| 2012/0000972 | A1 | 1/2012 | Learn | |
| 2012/0193325 | A1 | 8/2012 | Borgstrom | |
| 2014/0042125 | A1 | 2/2014 | Matsunaga | |
| 2015/0170856 | A1 | 6/2015 | Rhein | |
| 2015/0243459 | A1 | 8/2015 | Rhein et al. | |
| 2020/0006022 | A1 | 1/2020 | Kowalik et al. | |

FOREIGN PATENT DOCUMENTS

| | | | |
|---|---|---|---|
| DE | 102017203894 | A1 | 9/2018 |
| ES | 2526220 | T3 | 1/2015 |
| WO | 2014074211 | A2 | 5/2014 |

OTHER PUBLICATIONS

Extended European Search Report dated Mar. 15, 2024 for corresponding European Application No. 21780079.6, pp. 1-14.

* cited by examiner

SYSTEM AND METHOD FOR OPERATING AN ELECTRICAL SWITCH

RELATED APPLICATION

This application claims the benefit to U.S. patent application Ser. No. 17/218,988, filed Mar. 31, 2021, which claims benefit to U.S. Provisional Patent Application No. 63/002,509, filed on Mar. 31, 2020, the entire contents of both which are incorporated herein by reference.

FIELD

Embodiments relate to electrical switches, and more particularly, high-voltage electrical switches.

SUMMARY

When electrical switches, such as air break switches, are moved to a closed position, electrical arcing may occur. Electrical arcing is dangerous for electrical workers and equipment present near the electrical switches. Arcing may be prevented by shutting off power at an upstream breaker before closing of the electrical switch. However, shutting off power at an upstream breaker may also shut off power to an entire area beyond the specific area being serviced. Accordingly, a need exists for a high-voltage electrical switch that reduces and/or eliminates electrical arcing when closing.

Thus, one embodiment provides a switch including a first electrical terminal, the first electrical terminal including a blade pivotable between an open position and a closed position, and a rod extending from the first electrical terminal parallel to the blade. The switch further includes a second electrical terminal configured to receive the blade when in the closed position, the second electrical terminal including a vacuum interrupter, wherein the vacuum interrupter engages the rod when in the closed position. Rotating the first electrical terminal in a first direction causes the blade to disengage from the second electrical terminal at a first point, and further rotating the first electrical terminal in the first direction causes the rod to disengage from the vacuum interrupter at a second point.

Another embodiments provides a method for operating a switch. The method comprises rotating, with a motor, a first electrical terminal in a first direction to a first position, wherein a blade connected to the first electrical terminal disengages a second electrical terminal at the first position, rotating, with the motor, the first electrical terminal in the first direction and to a second position, wherein a rod connected to the first electrical terminal disengages a vacuum interrupter connected to the second electrical terminal at the second position, and rotating, with the motor, the first electrical terminal in the first direction and to a third position.

Another embodiment provides a vacuum interrupter configured to be removable coupled to a switch having a first electrical terminal and a second electrical terminal, wherein the vacuum interrupter is removably coupled to the second electrical terminal. The vacuum interrupter includes a rod contact configured to receive a rod coupled to the first electrical terminal. Wherein when closing the switch, the rod contact engages the rod and arcing is prevented.

Other aspects of the application will become apparent by consideration of the detailed description and accompanying drawings.

BRIEF DESCRIPTION OF THE DRAWINGS

Like reference numerals will be used to refer to like parts from figure to figure in the following detailed description.

DETAILED DESCRIPTION

Before any embodiments of the application are explained in detail, it is to be understood that the application is not limited in its application to the details of construction and the arrangement of components set forth in the following description or illustrated in the following drawings. The application is capable of other embodiments and of being practiced or of being carried out in various ways. Any words of orientation, such as various forms of "up", "down", "top", "bottom", "above", and "below", used herein are for the purpose off describing particular embodiments only and are not intended to be limiting of the disclosure.

Figure 1:
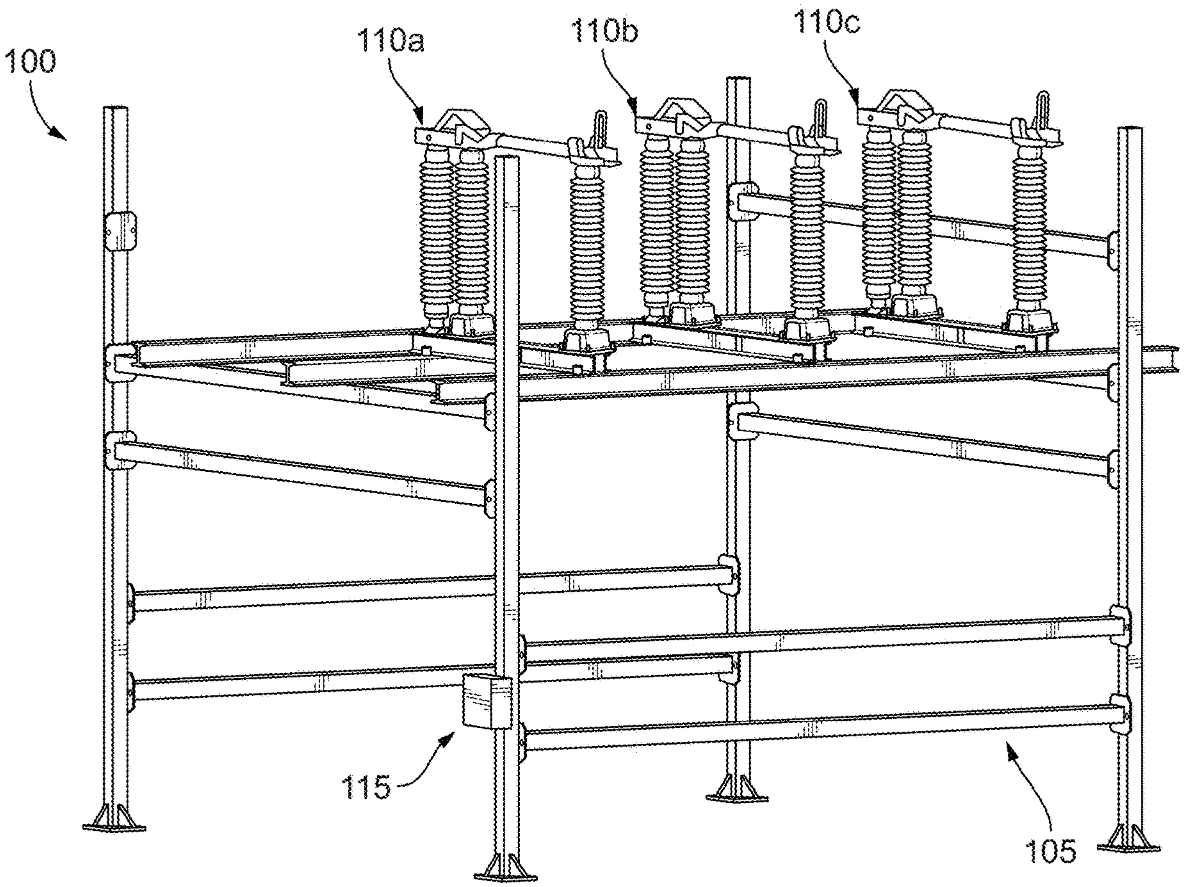
FIG. 1 is a perspective view of a substation according to some embodiments.

FIG. 1 is a perspective view of a substation 100 according to some embodiments. The substation 100 includes a base 105 and one or more switches 110*a*-110*c*. The base 105 is configured to support the one or more switches 110. The base 105 may be any type of appropriate utility structure, including, but not limited to, a substation structure.

Figure 2:
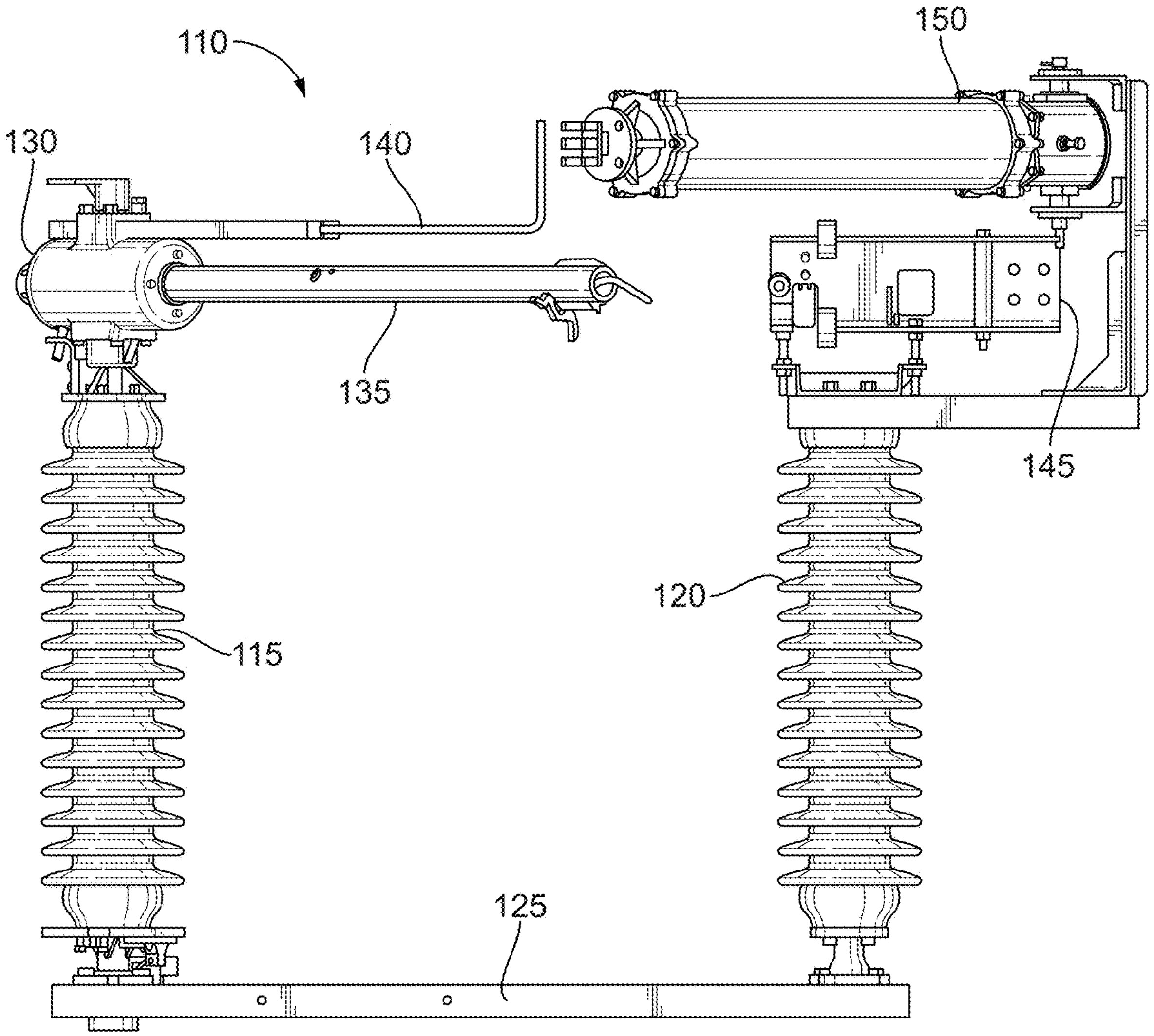
FIG. 2 is a front view of a switch of the substation of FIG. 1 according to some embodiments.

FIG. 2 illustrates a front view of a switch 110 according to some embodiments. Switch 110 may be a high voltage and/or high current switch configured to electrically connect/disconnect a power source to a load. In some embodiments, switch 110 is an air break switch. In other embodiments, switch 110 may be a vertical break switch (for example, FIGS. 12-17), side break switch, a double end break switch, a center break switch, a hookstick switch, or any other switch style.

The switch 110 includes a first elongated insulator 115 and a second elongated insulator 120 opposite the first elongated insulator 115. The first elongated insulator 115 and the second elongated insulator 120 may be connected by an insulator base 125. A first electrical terminal 130 may be supported by the first elongated insulator 115 and includes a blade 135 protruding from the first electrical terminal 130 in a first plane. A rod 140 may also protrude from the first electrical terminal 130, the rod 140 being substantially parallel to the blade 135 in a second plane different than the first plane. In some embodiments, the rod 140 is situated above the blade 135. A second electrical terminal 145 may be supported by the second elongated insulator 120.

Figure 5:
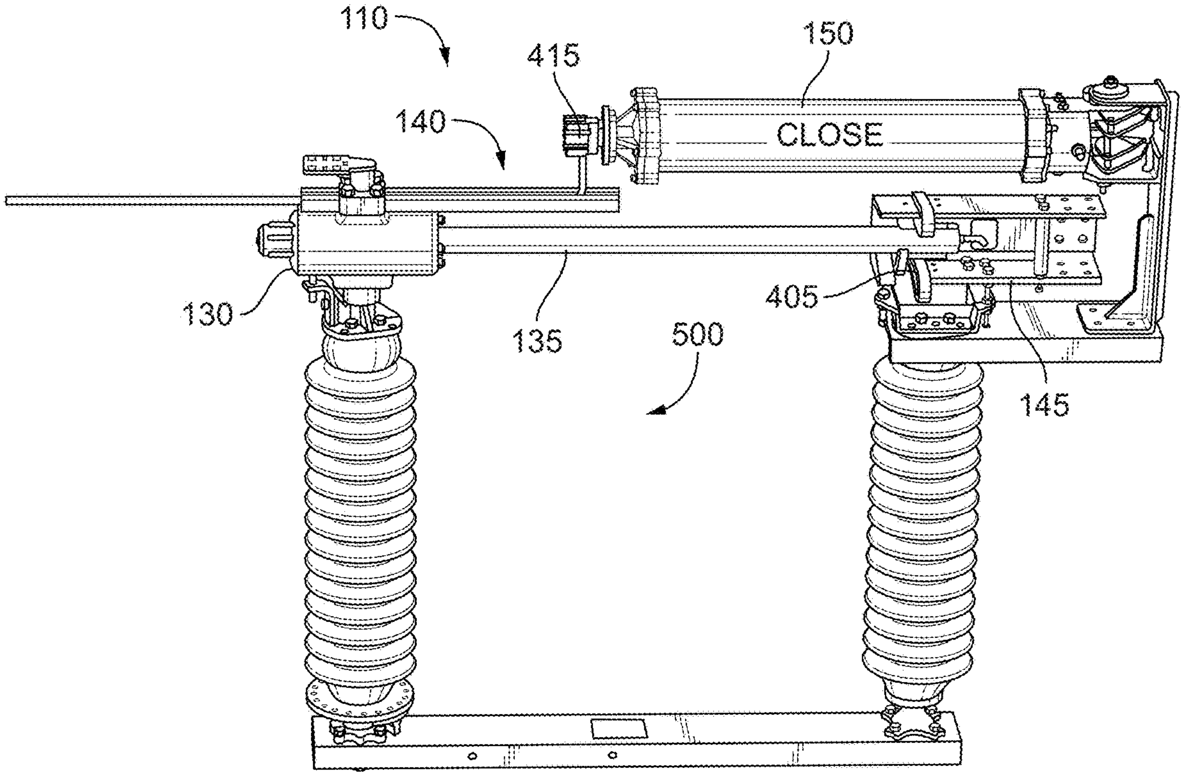
FIG. 5 is a perspective view of the switch of FIG. 2 in a closed position according to some embodiments.
Figure 8:
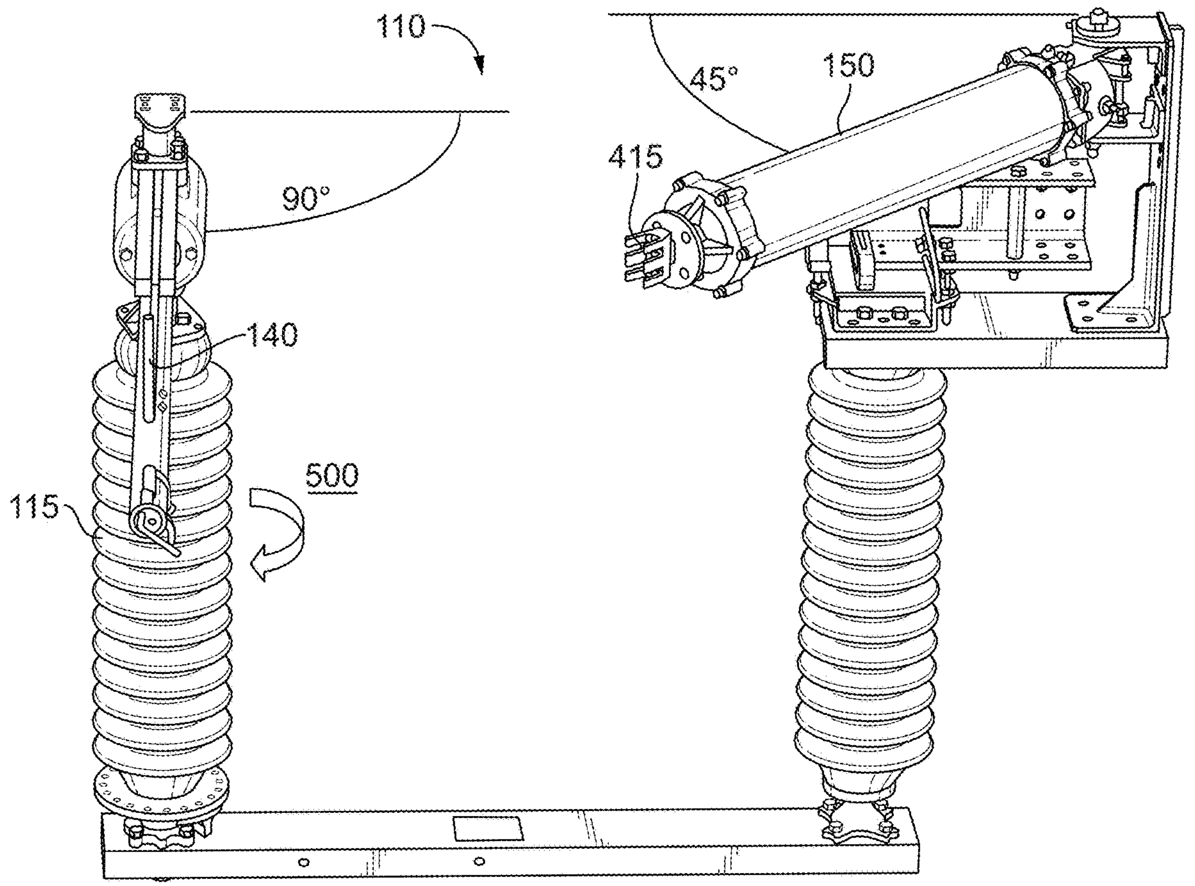
FIG. 8 is a perspective view of the switch of FIG. 2 in a fourth position according to some embodiments.

A vacuum interrupter 150 may be supported by the second electrical terminal 145. In some embodiments, the vacuum interrupter 150 may be removably coupled to (for example, bolted onto) the switch 110 when performing service in an area and/or on the switch 110. The blade 135 of the first electrical terminal 130 may be configured to move between a closed position (as illustrated in FIG. 5) and an open position (as illustrated in FIG. 8). When in the closed position, the blade 135 may be configured to be received (i.e., engaged to) the second electrical terminal 145, connecting a power source to a load.

Figure 3:
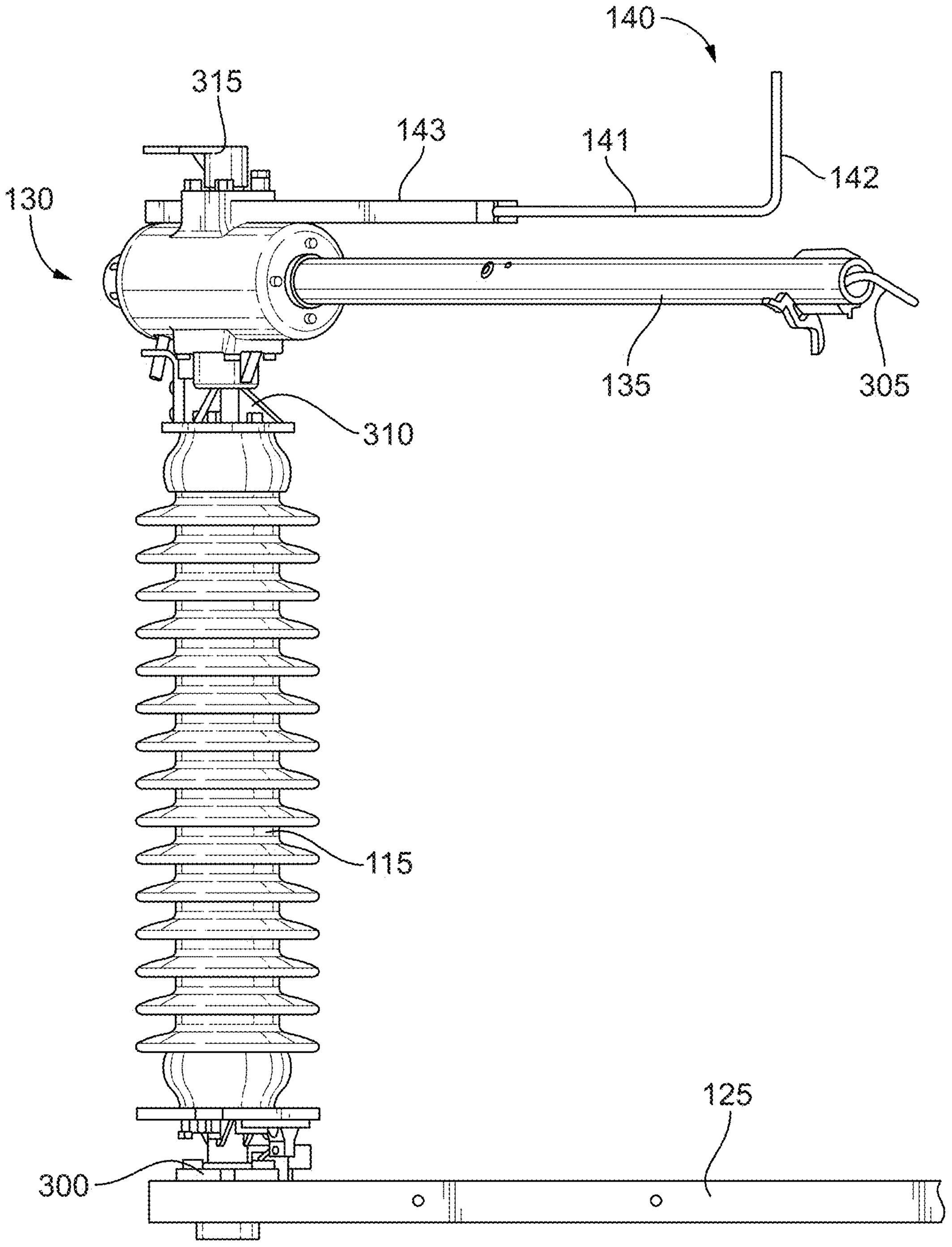
FIG. 3 is a front view of a first electrical terminal of the switch of FIG. 2 according to some embodiments.

FIG. 3 illustrates the first elongated insulator 115 and the first electrical terminal 130. The first elongated insulator 115 may be coupled to the insulator base 125 via a first bearing assembly 300. The first electrical terminal 130 may be coupled to the first elongated insulator 115 via a second bearing assembly 310. The first bearing assembly 300 allows the first elongated insulator 115 to rotate about a first vertical axis. The first vertical axis intersects the first elongated insulator 115 and may be perpendicular to the plane formed by the insulator base 125. The first elongated insulator 115 may rotate in a clockwise direction (e.g., a first direction) or a counter-clockwise direction (e.g., a second direction). As the first elongated insulator 115 rotates, the first electrical terminal 130 also rotates in the same direction. When in the closed position, rotating the first elongated insulator 115, and therefore the blade 135, in the first direction pivots the blade 135 from the closed position to the open position. Rotating the first elongated insulator 115 in the second direction pivots the blade 135 from the open position to the closed position. The blade 135 rotates in the first plane. As the first electrical terminal 130 rotates, the rod 140 also rotates in the same direction as the first electrical terminal 130. The rod 140 rotates in the second plane.

In some embodiments, the blade 135 includes an arcing arm 305 that prevents electrical arcing when the blade 135 disengages the second electrical terminal 145. The rod 140 includes a first rod portion 141, second rod portion 142, and a rod housing 143. The first rod portion 141 includes a first end connected to the first electrical terminal 130, such that the first rod portion 141 extends from the first electrical terminal 130. The second rod portion 142 extends substantially perpendicularly from a second end of the first rod portion 141. The second rod portion 142 is configured to engage the vacuum interrupter 150 of the second electrical terminal 145. In some embodiments, the rod 140 may be biased (for example, via a spring). When a force is applied to the rod 140, the rod 140 is pushed inwardly toward the rod housing 143. In the closed position, this force may be provided by the rod contact 415 (shown in FIG. 4). In some embodiments, when the switch 110 is in the closed position, the rod 140 is situated completely within the rod housing 143. As the force is reduced, the rod 140 moves outwardly from the rod housing 143 to a maximum rod length defined by the length of the first rod portion 141. The first electrical terminal 130 may also include a conductor contact 315 configured to connect to a transmission line.

Figure 4:
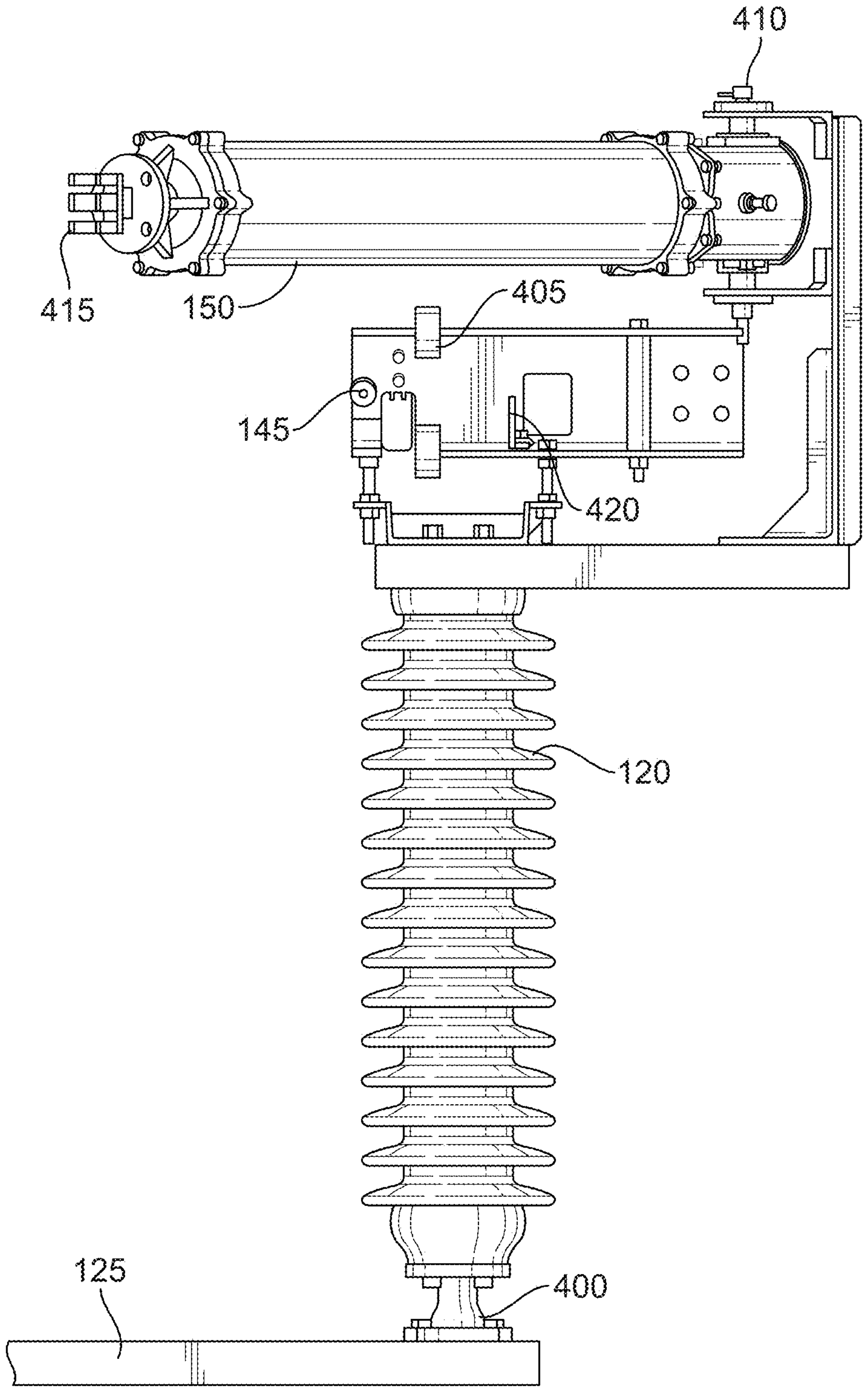
FIG. 4 is a front view of a second electrical terminal of the switch of FIG. 2 according to some embodiments.

FIG. 4 illustrates the second elongated insulator 120 and the second electrical terminal 145. The second elongated insulator 120 may connect to the insulator base 125 via a third bearing assembly 400. As detailed above, the second electrical terminal 145 may be supported by the second elongated insulator 120. The second electrical terminal 145 may include electrical contacts 405 configured to engage the blade 135. When the blade 135 engages the electrical contacts 405, the first elongated insulator 115 may no longer rotate about the vertical axis in the second direction. In some embodiments, the second electrical terminal 145 includes an arcing arm terminal 420 configured to connect to the arcing arm 305. The arcing arm terminal 420 extends outwardly from the second electrical terminal 145 such that the arcing arm 305 maintains connection to the arcing arm terminal 420 after the blade 135 disengages the electrical contacts 405.

The vacuum interrupter 150 may connect to the second electrical terminal 145 via a fourth bearing assembly 410. In some embodiments, the vacuum interrupter 150 includes a rod contact 415 (for example, a latch) configured to engage the rod 140. When the first elongated insulator 115 moves in the first direction, the rod 140 remains connected to the rod contact 415. Movement of the first elongated insulator 115 in the first direction results in the movement of the vacuum interrupter 150 about the fourth bearing assembly 410 due to a force provided by the rod 140. For example, movement of the first elongated insulator 115 in a clockwise direction results in the vacuum interrupter 150 rotating in a counter-clockwise direction. As the first elongated insulator 115 and the vacuum interrupter 150 rotate, the rod 140 maintains connection with the rod contact 415 until reaching a release point, further explained below. Additionally, rotation of the first elongated insulator 115 and the vacuum interrupter 150 results in a decreased force pressing the rod 140 into the rod housing 143. As the force pressing the rod 140 decreases, the rod 140 moves outwardly from the rod housing 143, allowing the rod 140 to maintain the connection with the rod contact 415.

FIG. 5 illustrates the switch 110 in the closed position, according to some embodiments. In the closed position, the second rod portion 142 of the rod 140 is engaged with the rod contact 415, and the blade 135 is engaged with the electrical contacts 405. The connection between the blade 135 and the electrical contacts 405 allows electrical current to flow between the first electrical terminal 130 and the second electrical terminal 145. When in the closed position, the first elongated insulator 115 can no longer be rotated in a counter-clockwise direction and the second elongated insulator 120 can no longer be rotated in the clockwise direction (as illustrated by the perspective angle view of FIG. 5). Rotating the first elongated insulator 115 in a clockwise direction, or the first direction (illustrated by arrow 500), results in the blade 135 disengaging the electrical contacts 405. Once the blade 135 disengages the electrical contacts 405, current flows through the vacuum interrupter 150.

Figure 6:
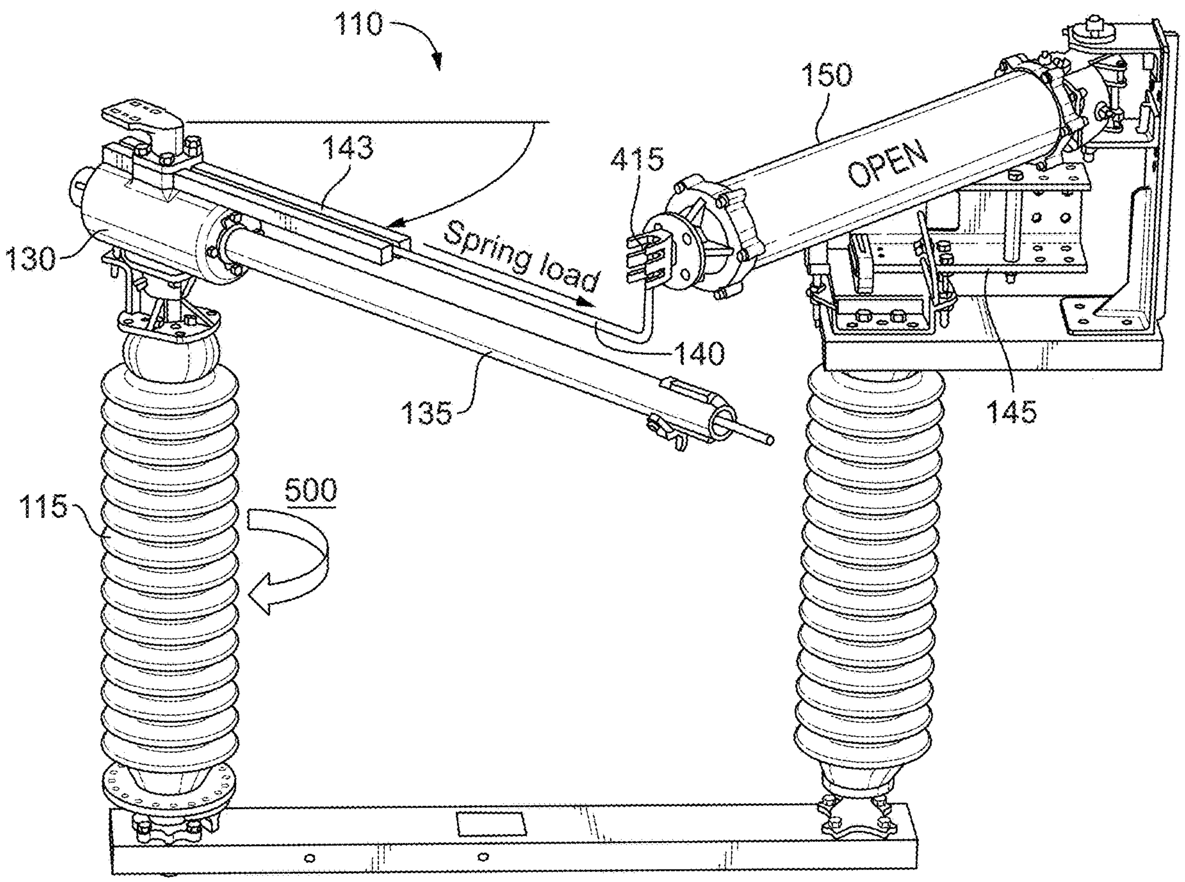
FIG. 6 is a perspective view of the switch of FIG. 2 in a second position according to some embodiments.

The switch 110 may be further rotated to a first point, illustrated in FIG. 6. As the first elongated insulator 115 rotates in the clockwise direction, the rod 140 proportionally moves outwardly from the rod housing 143. The vacuum interrupter 150 rotates opposite the first elongated insulator 115 (in the counter-clockwise direction) such that the rod 140 remains engaged with the rod contact 415. In some embodiments, once the switch 110 rotates to the first point, a first interrupter contact (not shown) and a second interrupter contact (not shown) within the vacuum interrupter 150 separate, interrupting the current within the vacuum interrupter 150. Accordingly, at the first point, current no longer flows from the first electrical terminal 130 to the second electrical terminal 145. In some embodiments, the first point is the point at which the switch 110 has rotated approximately 40 degrees.

Figure 7:
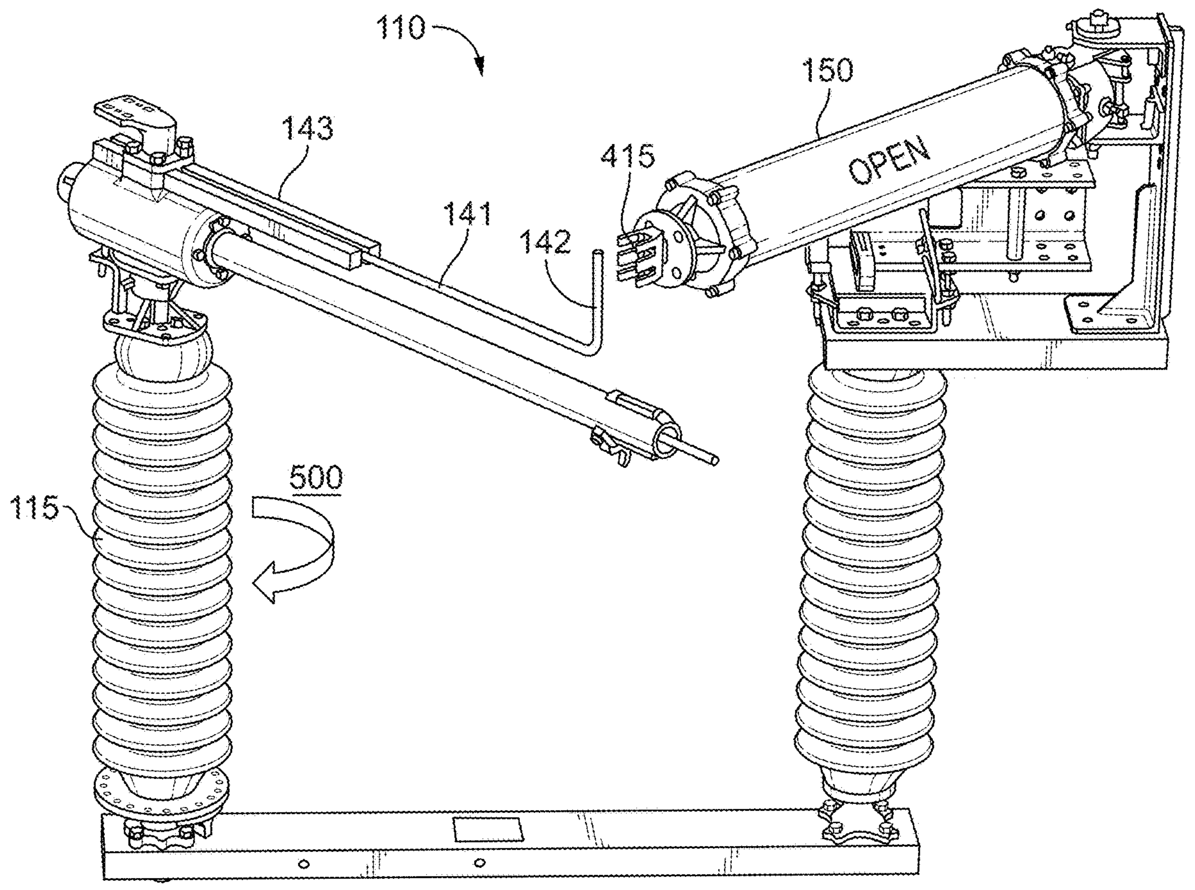
FIG. 7 is a perspective view of the switch of FIG. 2 in a third position according to some embodiments.

The switch 110 may be further rotated to a second point, illustrated in FIG. 7. As the first elongated insulator 115 and the vacuum interrupter 150 continue to rotate, the rod 140 continues to proportionally exit the rod housing 143. Once the first rod portion 141 is fully extended, additional rotation causes the rod 140 (and more specifically, the second rod portion 142) to disengage the rod contact 415. All electrical contact between the first electrical terminal 130 and the second electrical terminal 145 breaks at this point. Additionally, since the vacuum interrupter 150 is now in an open state, electrical arcing does not occur outside of the vacuum interrupter 150. In some embodiments, an electrical arc is extinguished prior to the rod 140 disengaging the rod contact 415. In some embodiments, the second point is the point at which the switch 110 has rotated approximately 45 degrees.

In some embodiments, as illustrated in FIG. 8, the first elongated insulator 115 further rotates to 90 degrees, and the switch 110 enters the open position. Once the first elongated insulator 115 has rotated approximately 90 degrees, it may no longer rotate in the clockwise direction. In some embodiments, the first elongated insulator 115 remains at the second point and may no longer rotate in the clockwise direction once the rod 140 disengages the rod contact 415. In some embodiments, as illustrated in FIG. 8, the vacuum interrupter 150 remains at the second point. In some embodiments, the vacuum interrupter 150 is unable to rotate beyond approximately 45 degrees. However, in other embodiments, the vacuum interrupter 150 rotates beyond 45 degrees (for example, approximately 90 degrees).

Figure 9:
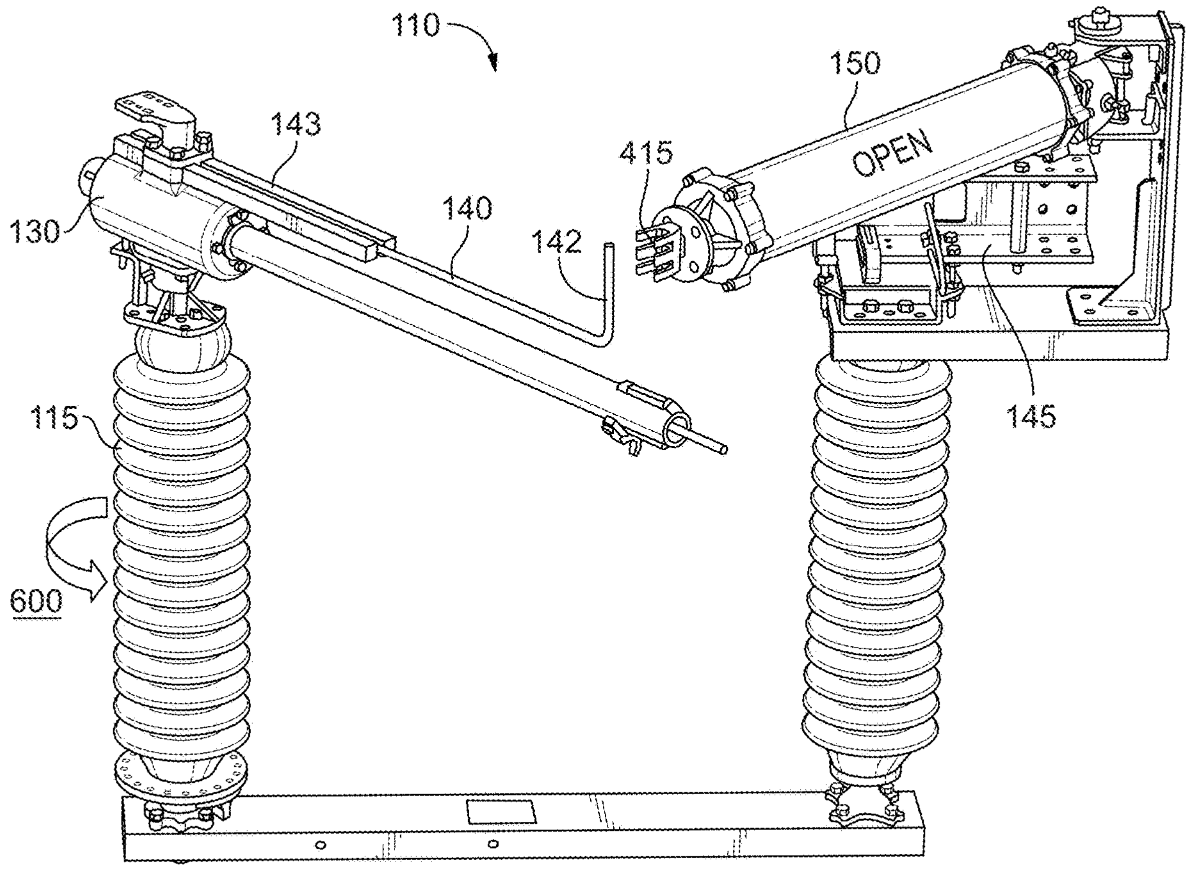
FIG. 9 is a perspective view of the switch of FIG. 2 in a fifth position according to some embodiments.

Once in the open position, the first elongated insulator 115 may rotate in the counter-clockwise direction, or the second direction (illustrated by arrow 600 in FIG. 9) to re-enter the closed position. As illustrated in FIG. 9, the second rod portion 142 engages the rod contact 415 at the second point when the first elongated insulator 115 is rotated in the counter-clockwise direction. Once the rod 140 is engaged, the rod 140 pushes the rod contact 415, and therefore the vacuum interrupter 150. When the first elongated insulator 115 rotates in the counter-clockwise direction, and the rod 140 is engaged with the rod contact 415, continued movement of the first elongated insulator 115 in the counter-clockwise direction results in the movement of the vacuum interrupter 150 in the clockwise direction.

Figure 10:
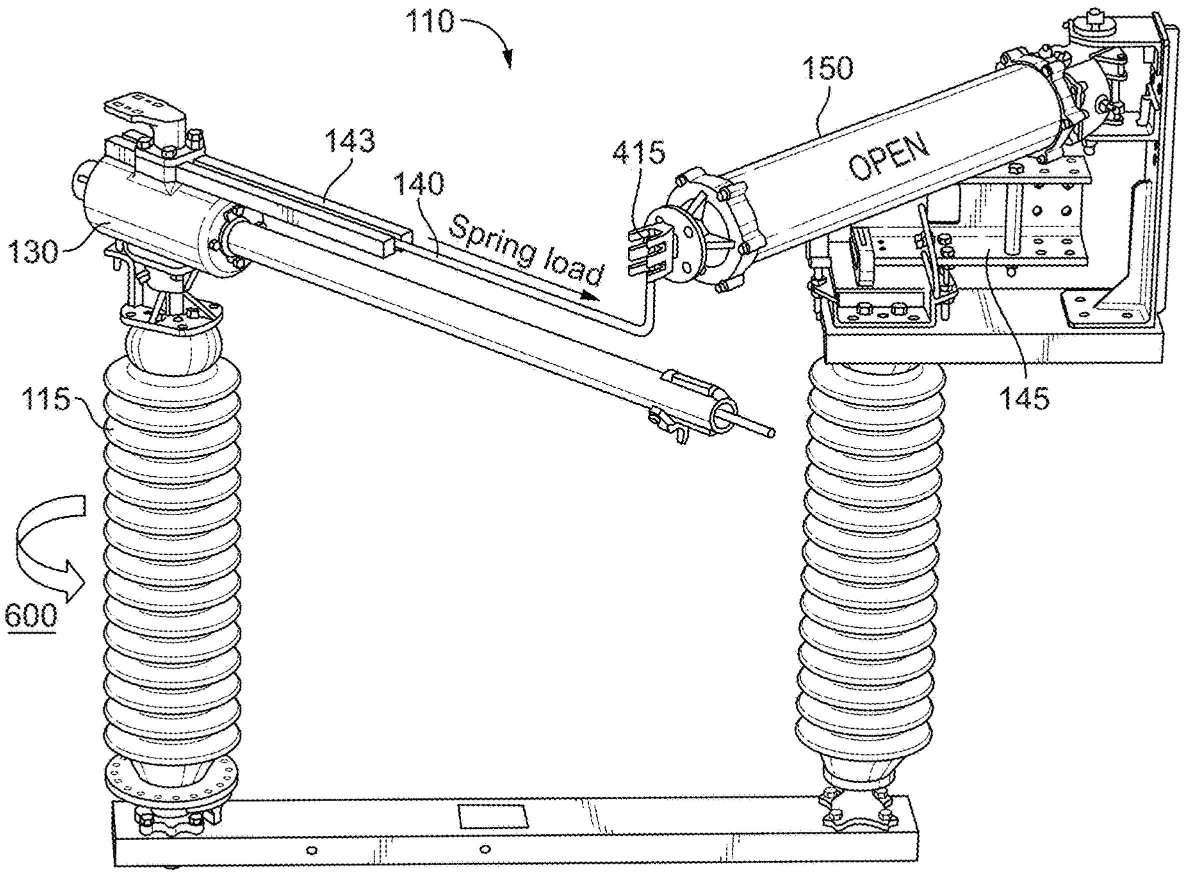
FIG. 10 is a perspective view of the switch of FIG. 2 in a sixth position according to some embodiments.

The first elongated insulator 115 may continue to rotate in the counter-clockwise direction. As illustrated in FIG. 10, as the first elongated insulator 115 and the vacuum interrupter 150 continue to rotate, the rod 140 is pushed into the rod housing 143. As the vacuum interrupter 150 rotates, the first interrupter contact and the second interrupter contact engage, allowing electrical current to flow within the vacuum interrupter 150 and placing the vacuum interrupter 150 in a closed state. The electrical current flows from the vacuum interrupter 150 to the rod 140, establishing an electrical connection between the first electrical terminal 130 and the second electrical terminal 145. In some embodiments, the vacuum interrupter 150 enters the closed state at the first point. In some embodiments, the vacuum interrupter 150 enters the closed state when the switch 110 is 35 degrees from entering the closed state.

As the first elongated insulator 115 continues to rotate in the counter-clockwise direction, and the vacuum interrupter 150 continues to be rotated in the clockwise direction, the switch 110 enters the closed state, as shown in FIG. 5. When entering the closed state, arcing is prevented from occurring. In some embodiments, arcing is prevented from occurring as a result of the vacuum interrupter 150 entering the closed state (and thus allowing current to flow through the vacuum interrupter 150) before the blade 135 makes an electrical connection with the second electrical terminal 145. For example, the vacuum interrupter 150 may be closed via the rod 140 when the switch 110 is 35 degrees from entering the closed state.

Figure 11:
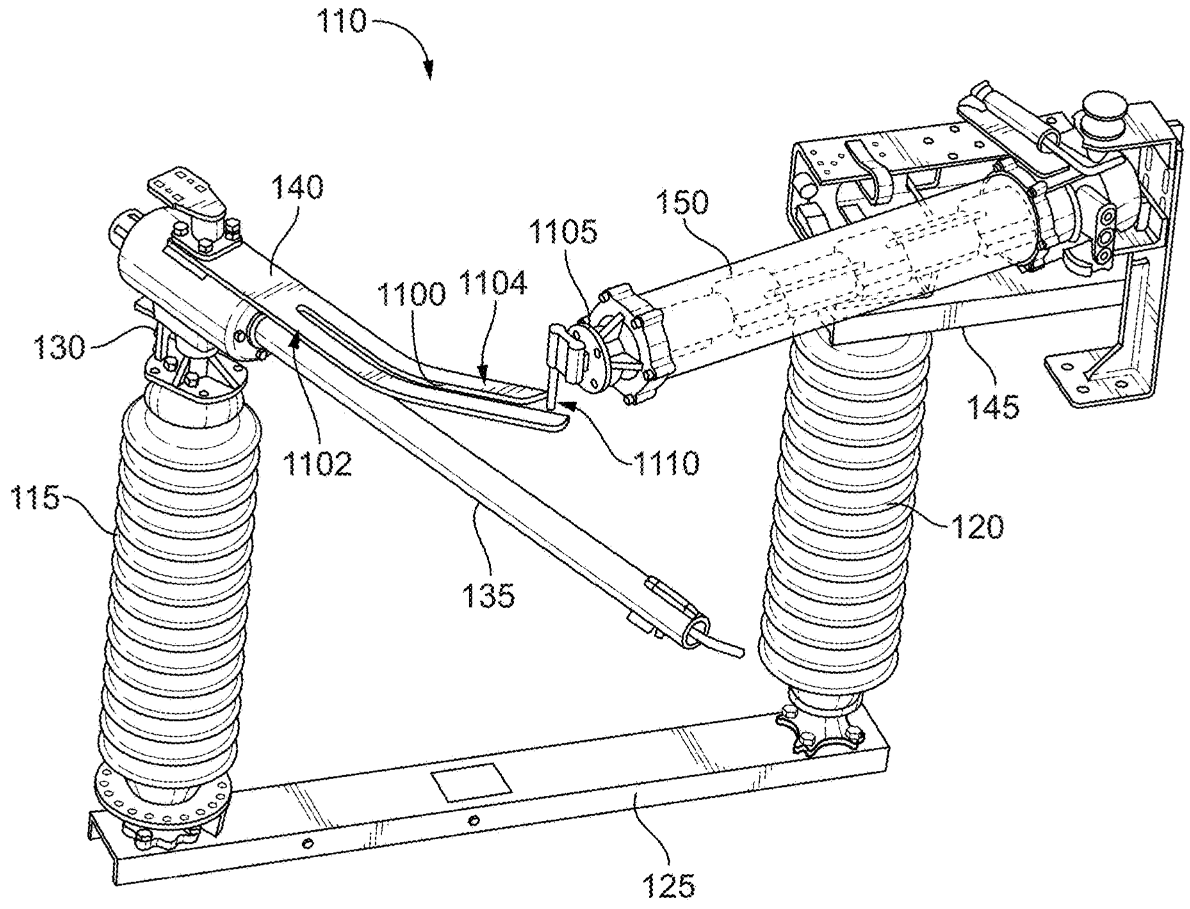
FIG. 11 is a front view of a switch of the substation of FIG. 1 according to some embodiments.

FIG. 11 illustrates the switch 110 according to an alternative embodiment. The first elongated insulator 115 and the second elongated insulator 120, the insulator base 125, the first electrical terminal 130, and the second electrical terminal 145 may function similar to that of the switch 110 of FIG. 2. For example, when the switch 110 is in the closed position, the blade 135 may be received by the second electrical terminal 145.

In some embodiments, the rod 140 includes a receiving portion 1100. The receiving portion 1100 may further include a first receiving portion 1102 and a second receiving portion 1104. The first receiving portion 1102 may extend from the first electrical terminal 130 parallel to the blade 135. The second receiving portion 1104 may extend at an angle from the first receiving portion 1102, such that the second receiving portion 1104 is not parallel to the blade 135. In some embodiments, the second receiving portion 1104 extends from the first receiving portion 1102 at an angle, such that the second receiving portion 1104 extends in an axis different from the first receiving portion. In some embodiments, the second receiving portion 1104 is situated on the same plane as the first receiving portion 1102.

In some embodiments, the vacuum interrupter 150 includes an interrupter terminal 1105 with an interrupter rod 1110. The interrupter rod 1110 may extend vertically from the interrupter terminal 1105 such that, when in the closed position, the interrupter rod 1110 is received by the receiving portion 1100, creating an electrical connection between the first electrical terminal 130 and the second electrical terminal 145. When in the closed position, the interrupter rod 1110 may be in the first receiving portion 1102. As the switch 110 transitions to the open position, the interrupter rod 1110 moves from the first receiving portion 1102 to the second receiving portion 1104. In some embodiments, the interrupter rod 1110 separates from the second receiving portion 1104 at the second point, as described above. In some embodiments, operation of the first elongated insulator 115, the second elongated insulator 120, the first electrical terminal 130, the second electrical terminal 145, and the blade 135 are similar to that as defined previously above.

FIGS. 12-17 illustrates a vertical break switch 1210 according to some embodiments. Switch 1210 may be a high voltage and/or high current switch configured to electrically connect/disconnect a power source to a load. In some embodiments, switch 1210 includes components that operate similarly to components of switch 110.

As illustrated, the vertical break switch 1210 may include first elongated insulators (although in other embodiments, there may be a single first elongated insulator) 1215 and a second elongated insulator 1220 opposite the first elongated insulator(s) 1215. The first elongated insulator(s) 1215 and the second elongated insulator 1220 may be connected by an insulator base 1225. A first electrical terminal 1230 may be supported by the first elongated insulator 1215 and includes a blade 1235 protruding from the first electrical terminal 1230 in a first plane. A second electrical terminal 1245 may be supported by the second elongated insulator 1220. A vacuum interrupter 1250 may be supported by the second electrical terminal 1245. Similar to other embodiments disclosed herein, the vacuum interrupter 1250 may be releasably coupled to the vertical break switch 1210.

In the illustrated embodiment, a first rod 1240 may also protrude from the first electrical terminal 1230, the rod 1240 being substantially parallel to the blade 1235. Additionally, a vacuum interrupter rod, or second rod, 1248 may protrude from the vacuum interrupter 1250.

Figure 12A:
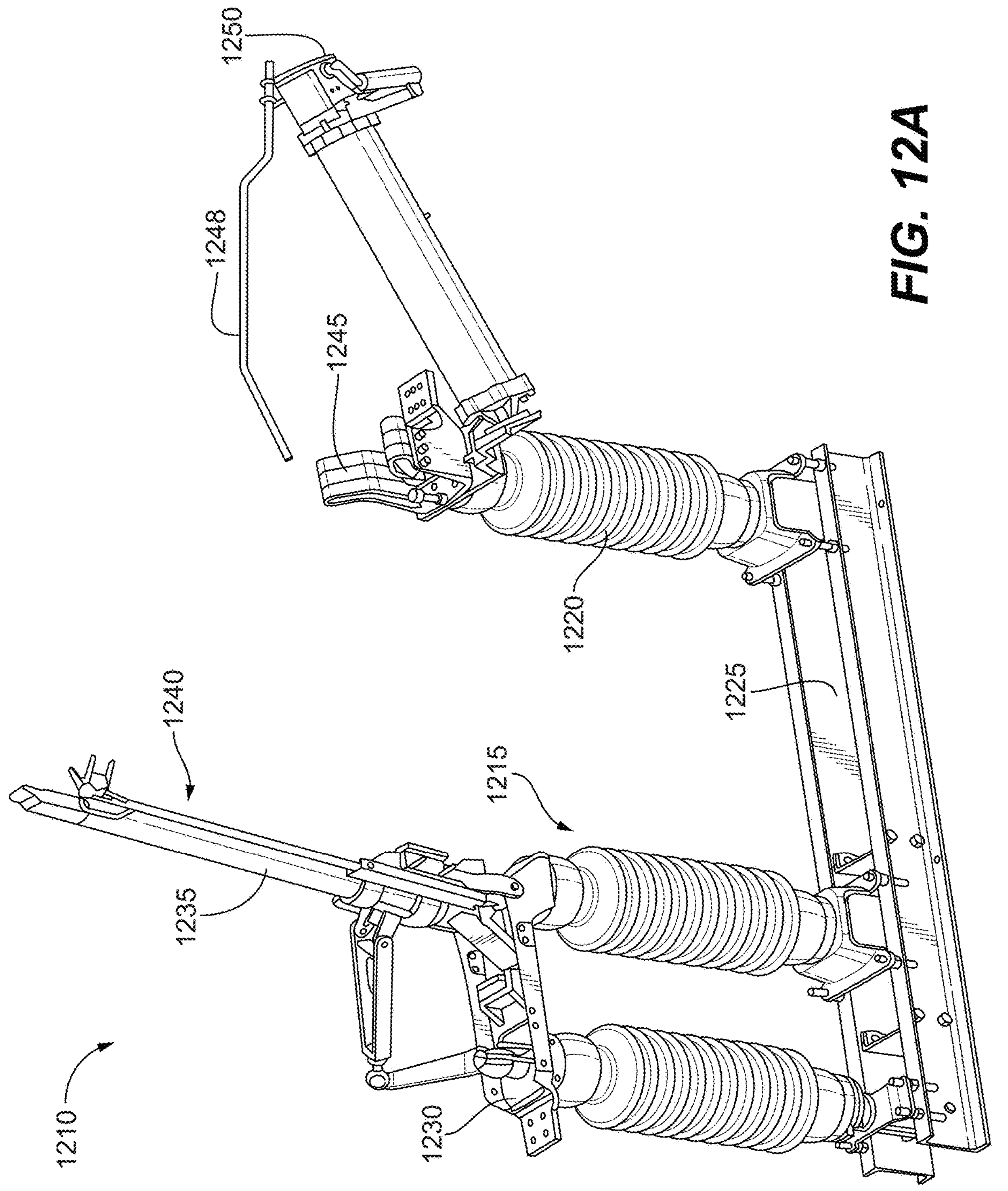
FIGS. 12A-12D are perspective views of a switch according to some embodiments.
Figure 12B:
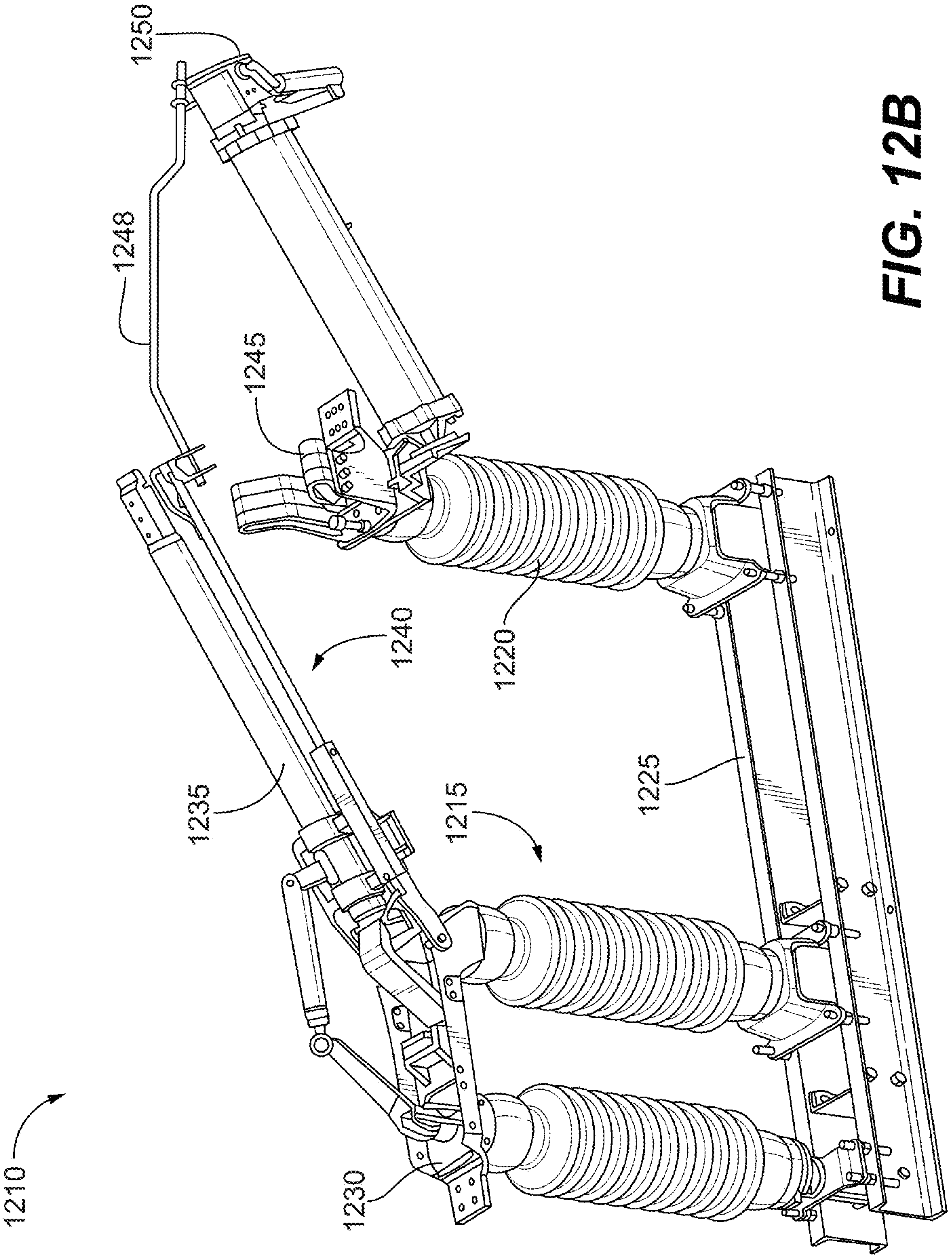
Figure 12C:
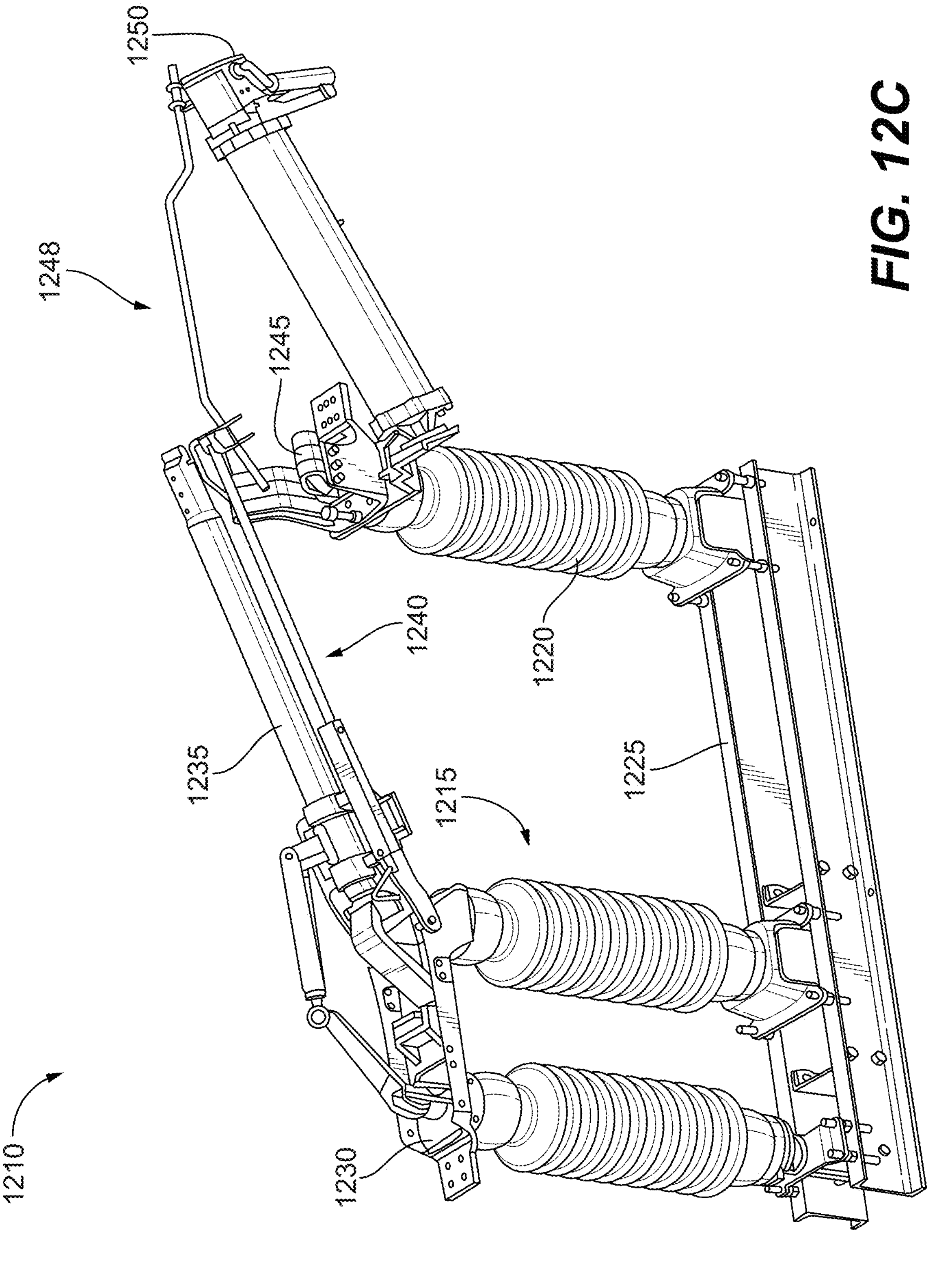
Figure 12D:
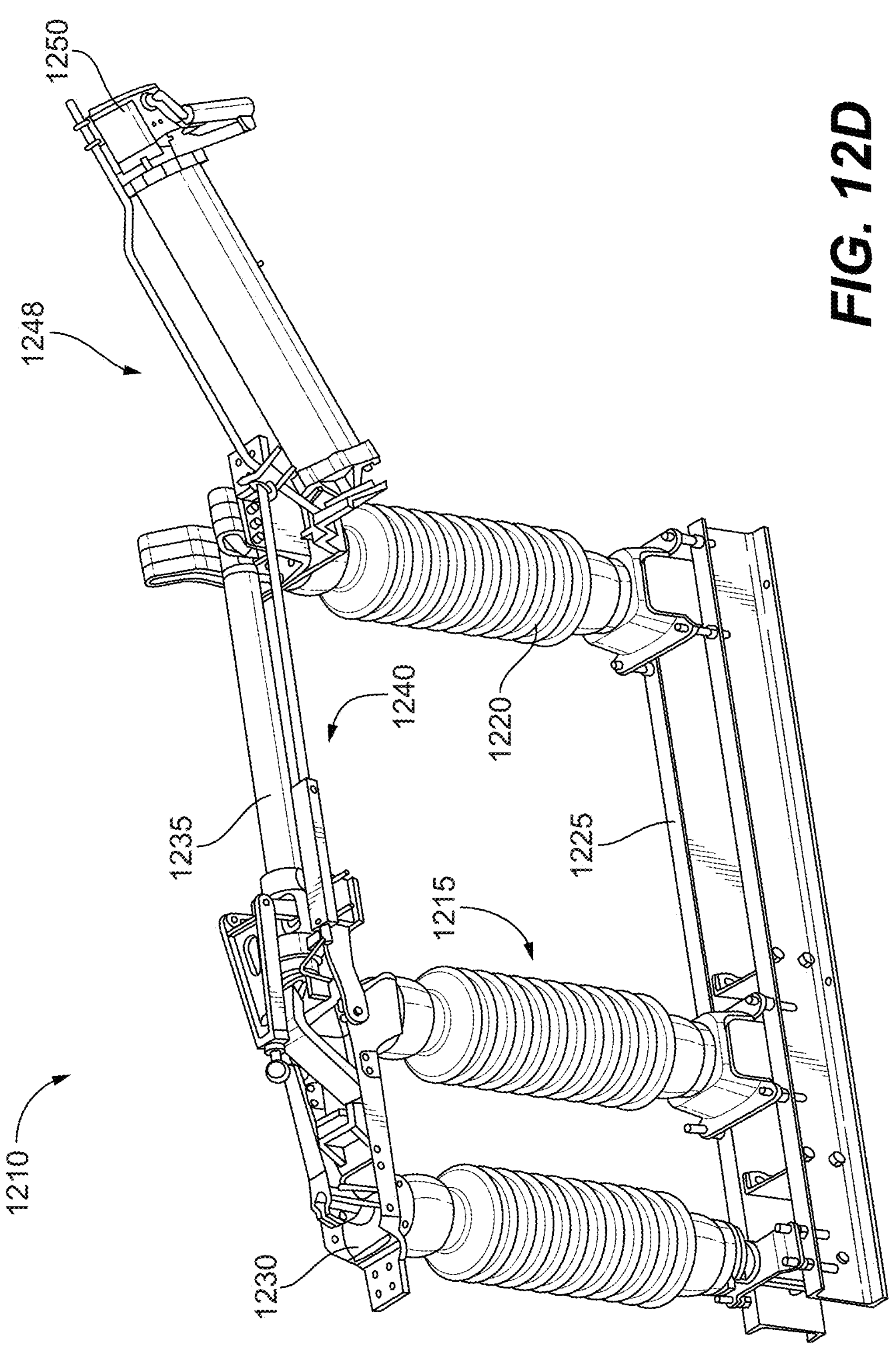
Figure 13A:
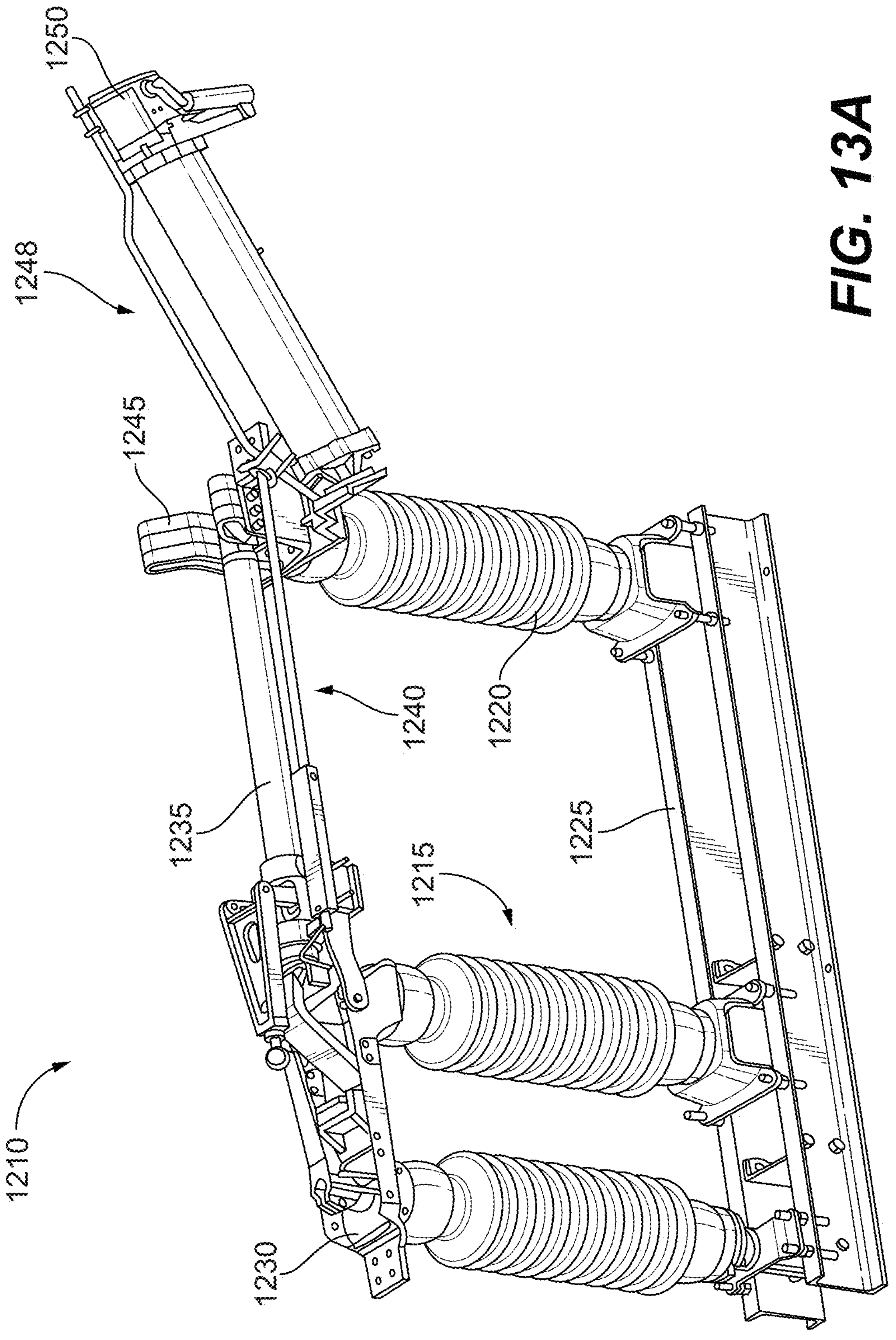
FIGS. 13A-13D are perspective views of a switch according to some embodiments.
Figure 13B:
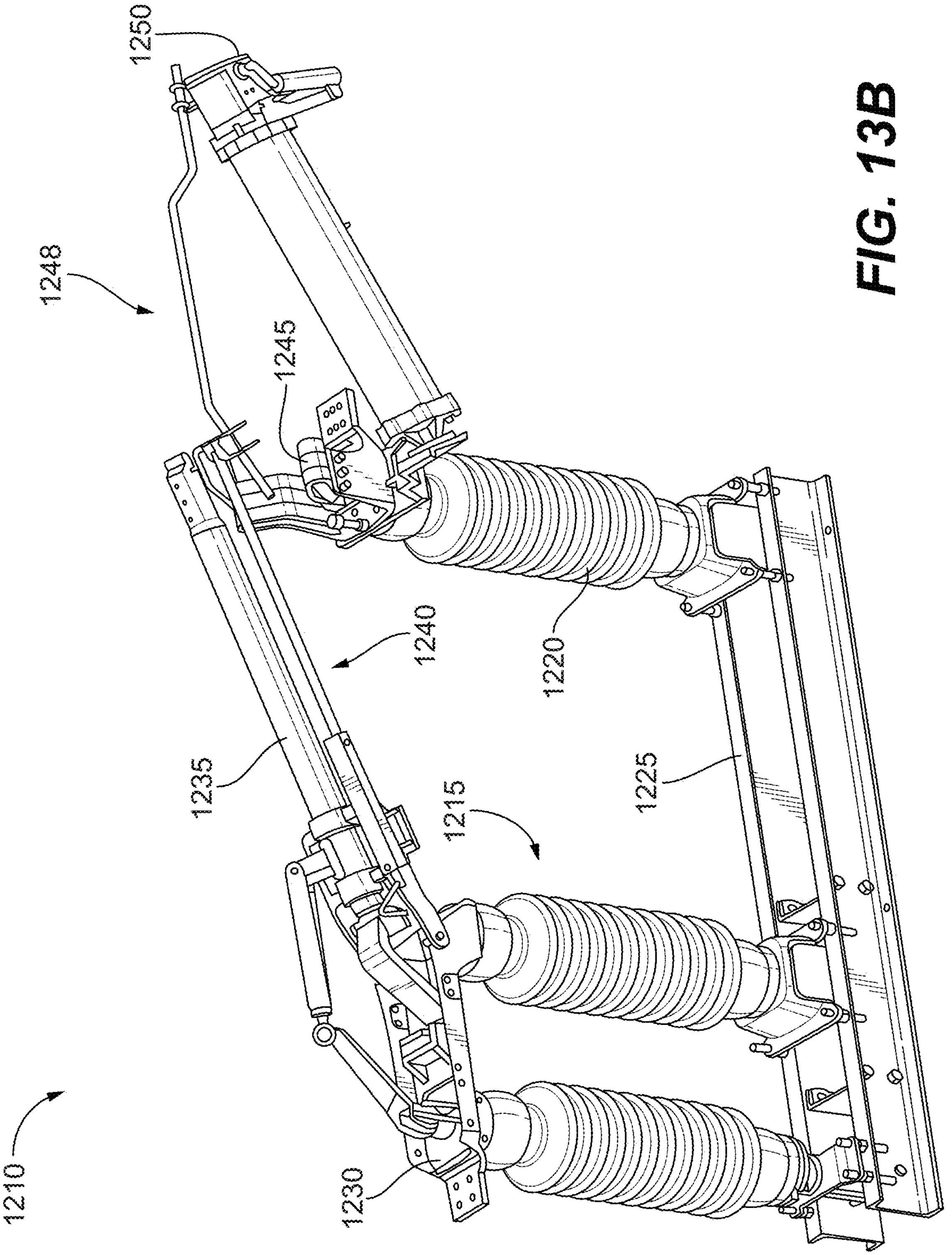
Figure 13C:
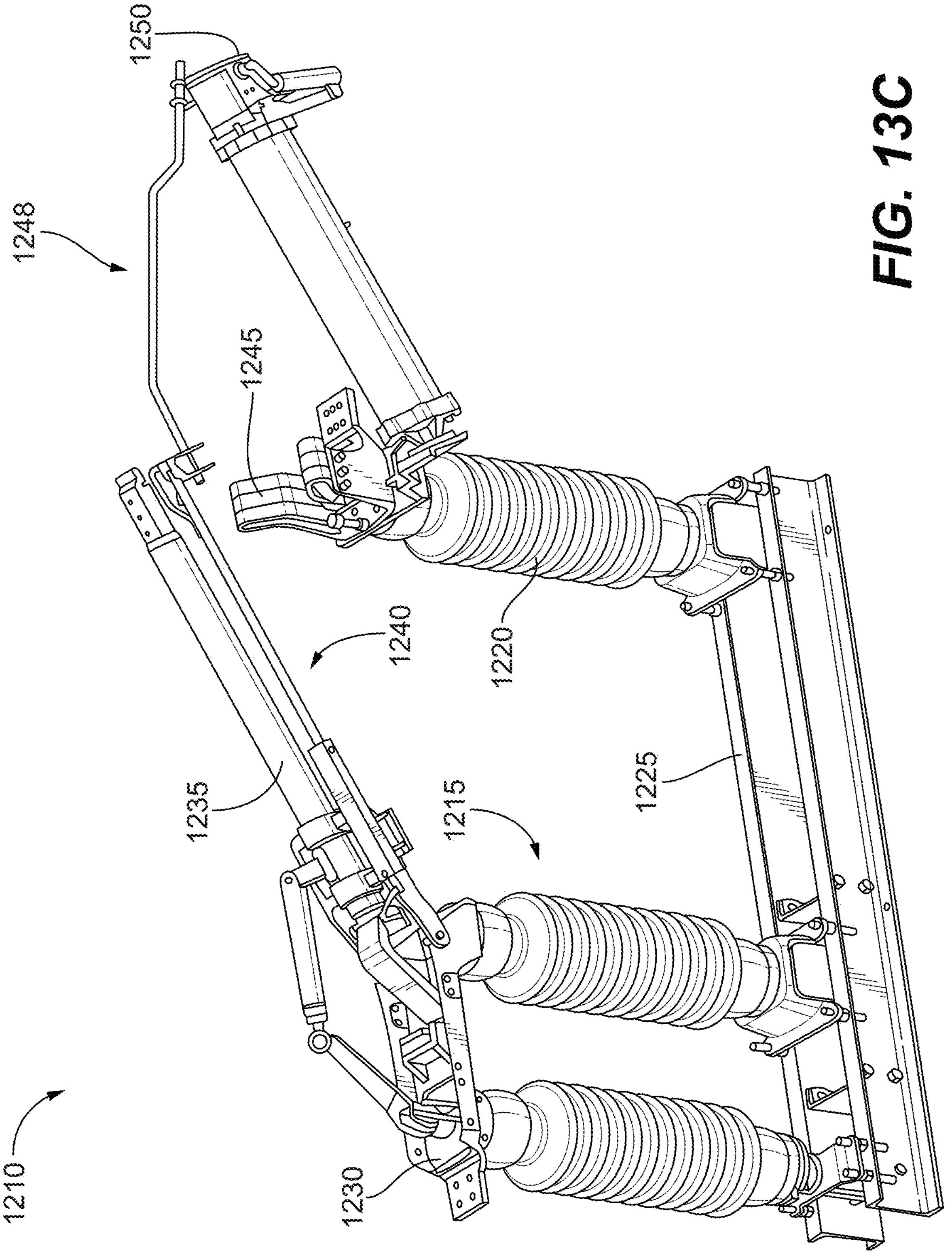
Figure 13D:
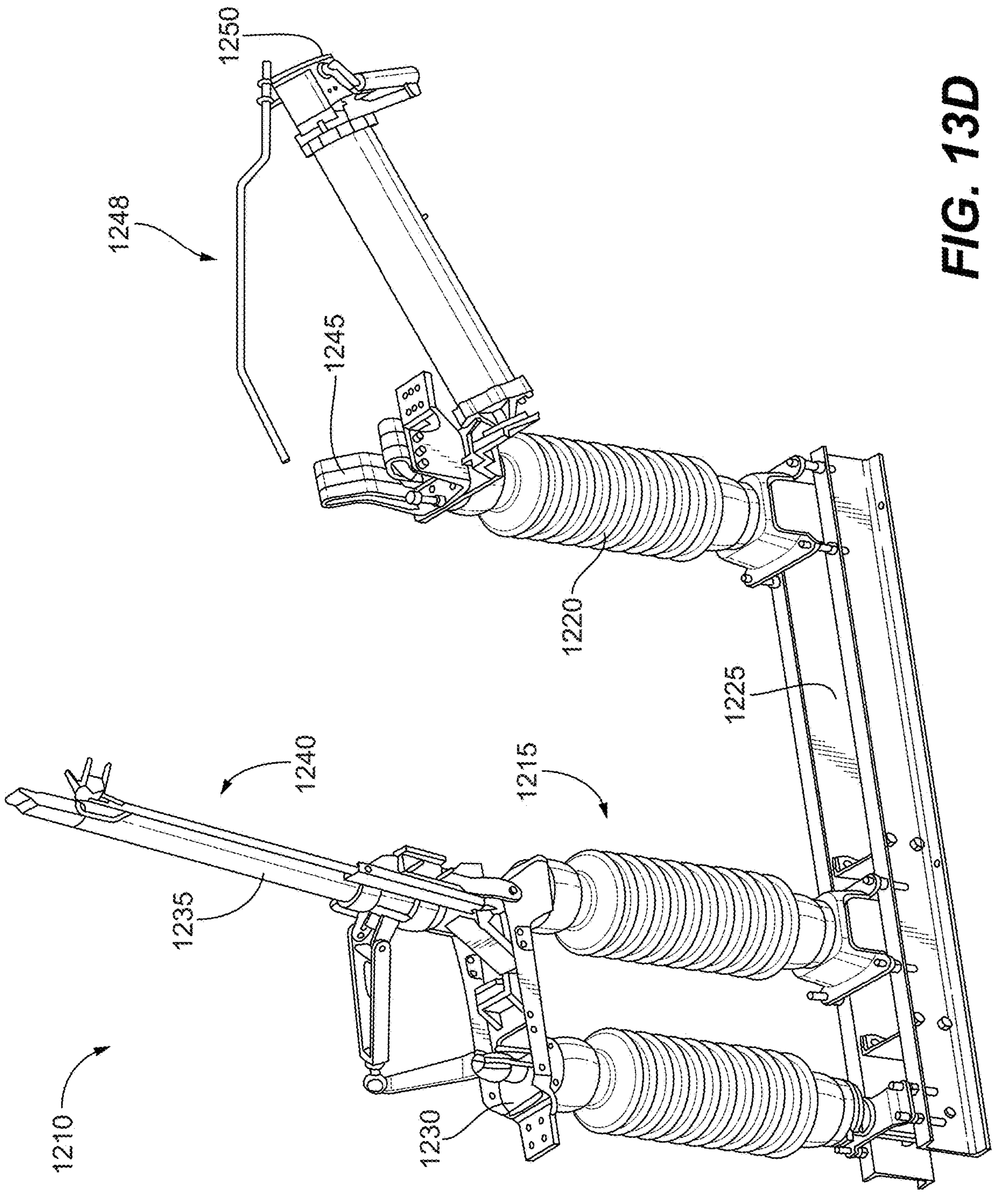

FIGS. 12A-12D illustrate the vertical break switch 1210 entering a closed position (FIG. 12D) from an open position (FIG. 12A). FIGS. 13A-13D illustrate the vertical break switch 1210 entering the open position (FIG. 13D) from the closed position (FIG. 13A).

Figure 14A:
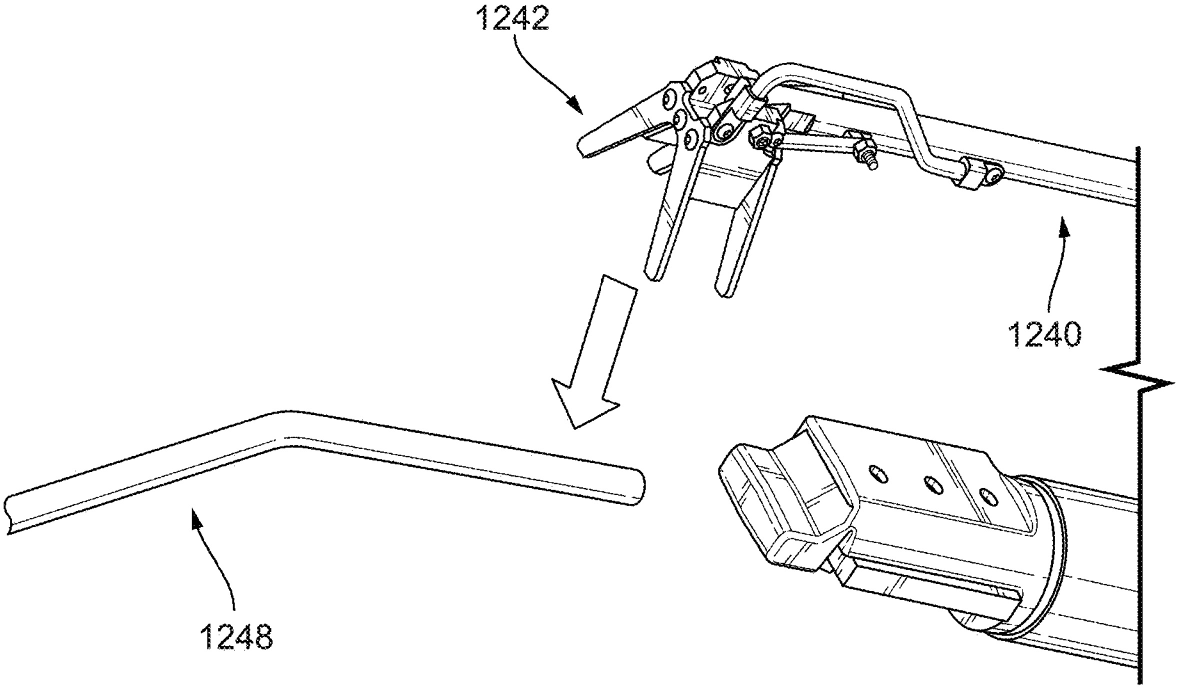
FIGS. 14A-14C are perspective views of a rod of the switch of FIGS. 12A-12D and 13A-13D according to some embodiments.
Figure 14B:
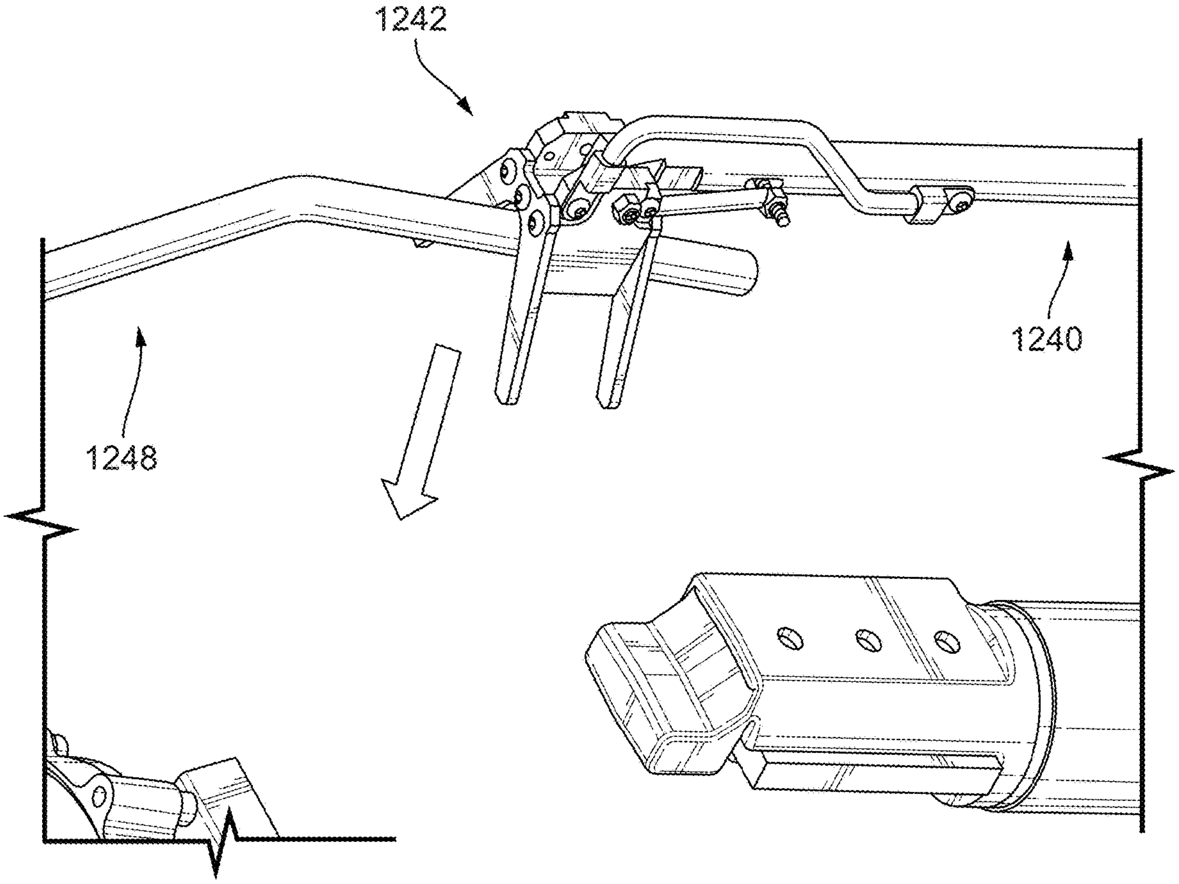
Figure 14C:
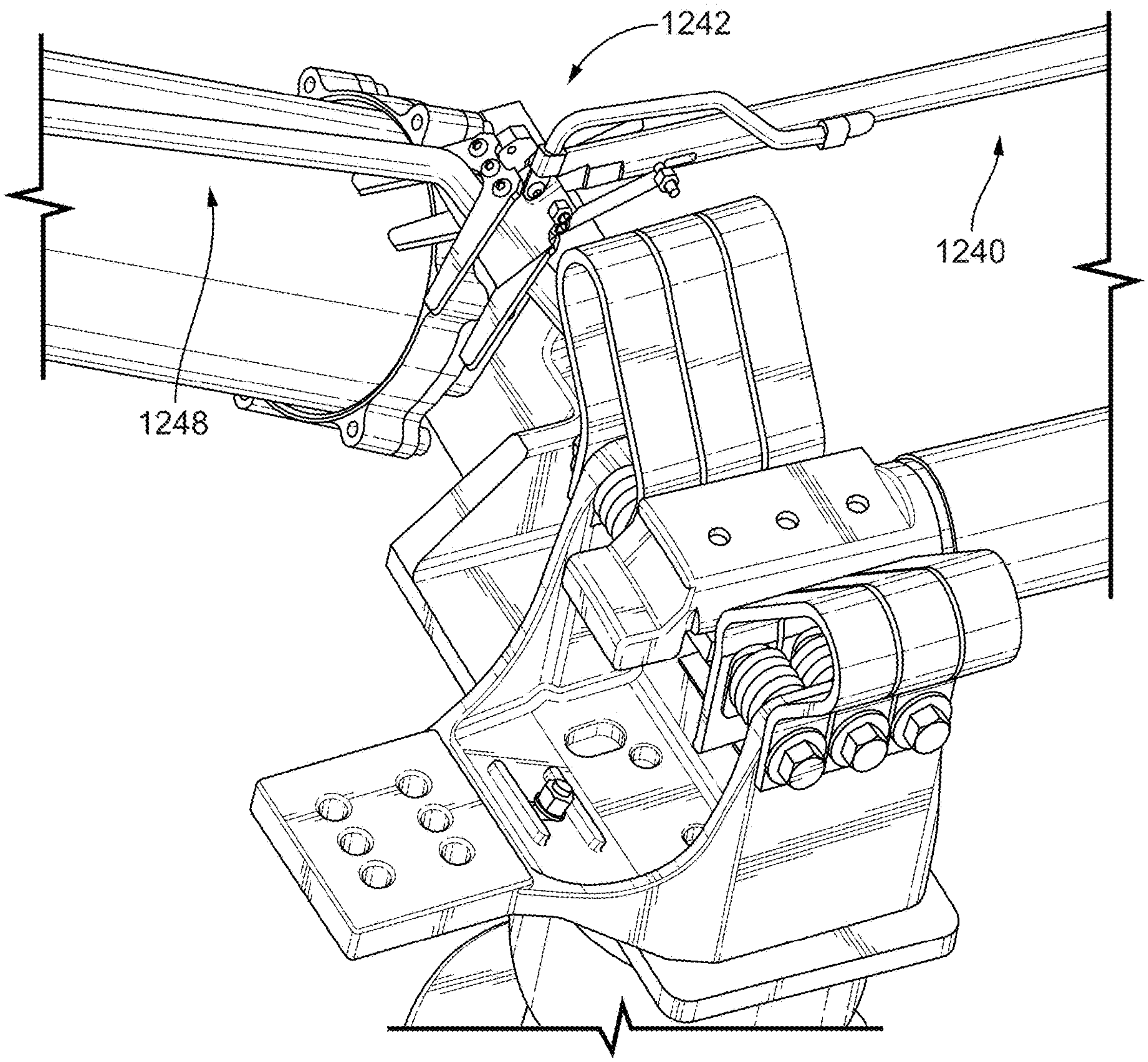

FIGS. 14A-14C illustrate an interaction between the first rod 1240 and the vacuum interrupter rod 1248 during closing of the vertical break switch 1210. As illustrated, the first rod 1240 may include a rod receiving portion 1242. The rod receiving portion 1242 may be biased (for example, via a spring) in a first position (illustrated by FIGS. 14A and 14B). During closing of the vertical break switch 1210, the rod receiving portion 1242 engages (or receives) the vacuum interrupter rod 1248 (thus closing the vacuum interrupter). When closing the vertical break switch 1210, arcing is prevented from occurring (for example, by the vacuum interrupter being closed prior to the switch 1210 entering the closed state). In the illustrated embodiment, when engaging with the vacuum interrupter rod 1248, the rod receiving portion 1242 may move to a second position (illustrated by FIG. 14C).

Figure 15:
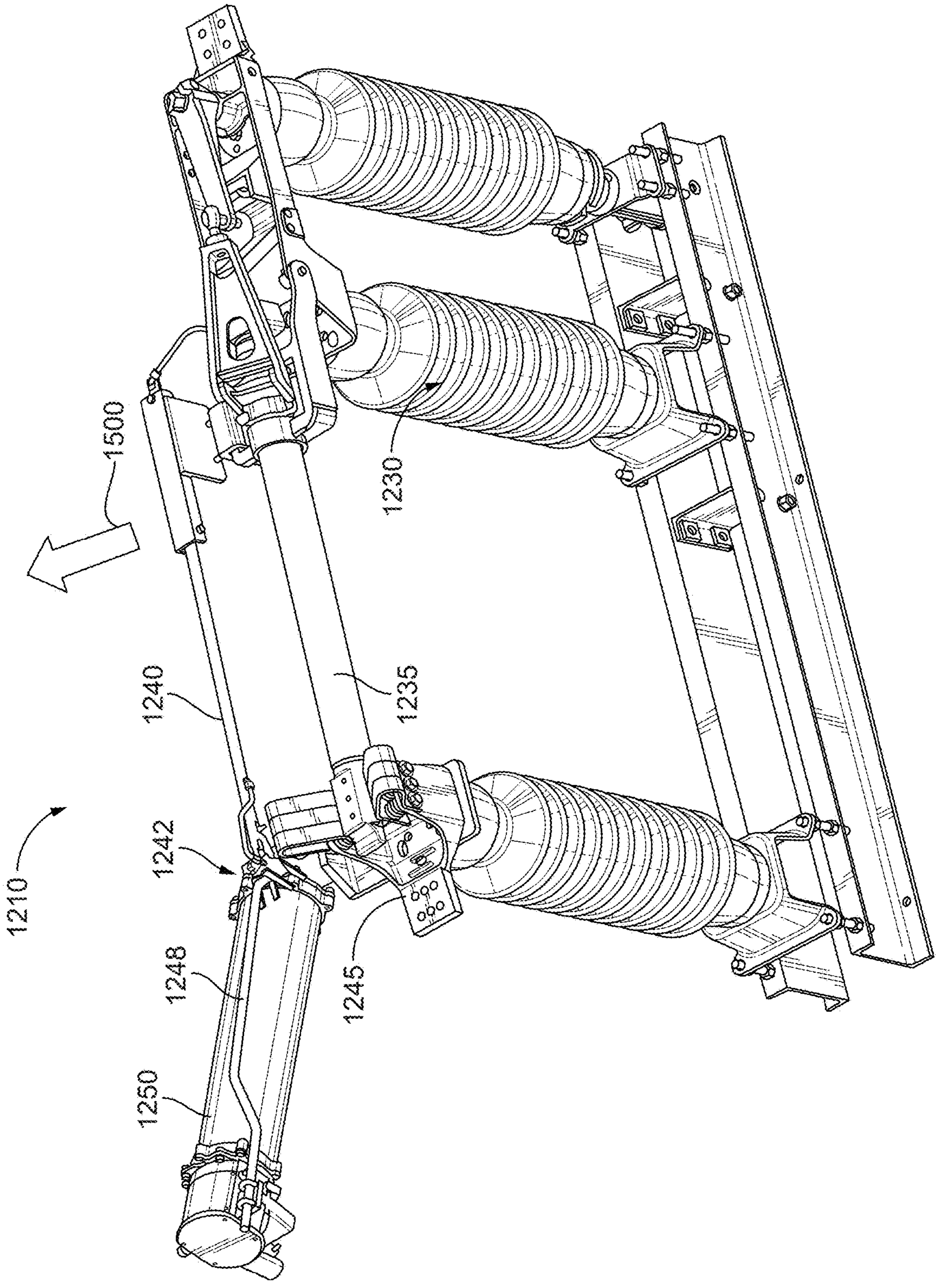
FIG. 15 is a perspective view of the switch of 12A-12D and 13A-13D in a closed position according to some embodiments.

FIG. 15 illustrates the switch 1210 in the closed position, according to some embodiments. In the closed position, the vacuum interrupter rod 1248 is engaged with the rod receiving portion 1242 of the first rod 1240, and the blade 1235 is engaged with the second electrical terminal 1245 (for example, electrical contacts of second electrical terminal 1245). The connection between the blade 1235 and the second electrical terminal 1245 (for example, electrical contacts of second electrical terminal 1245) allows electrical current to flow between the first electrical terminal 1230 and the second electrical terminal 1245. Rotating the blade 1235 in a direction 1500 results in the blade 135 disengaging the second electrical terminal 1245 (for example, electrical contacts of second electrical terminal 1245).

Figure 16:
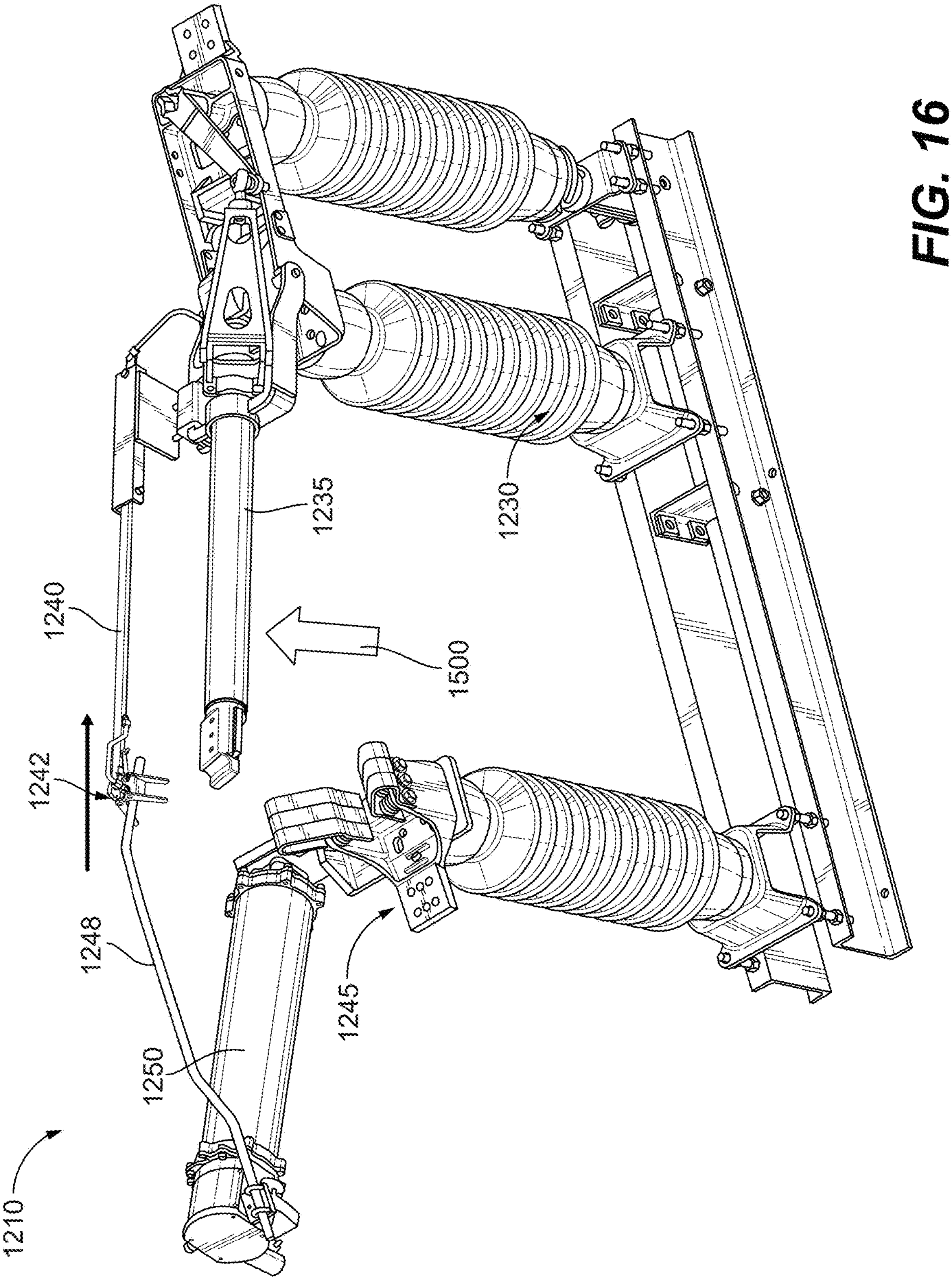
FIG. 16 is a perspective view of the switch of 12A-12D and 13A-13D in a second position according to some embodiments.

The switch 1210 may be further rotated to a first point, illustrated in FIG. 16. As the blade 1235 is rotated away from the second electrical terminal 1245, the rod 1240 proportionally moves in the same direction. The rod 1240 (and more specifically, the rod receiving portion 1242) remains engaged with the vacuum interrupter rod 1248. In some embodiments, once the switch 1210 is rotated to the first point, a first interrupter contact (not shown) and a second interrupter contact (not shown) within the vacuum interrupter 1250 separate, interrupting the current within the vacuum interrupter 1250. Accordingly, at the first point, current no longer flows from the first electrical terminal 1230 to the second electrical terminal 1245.

Figure 17:
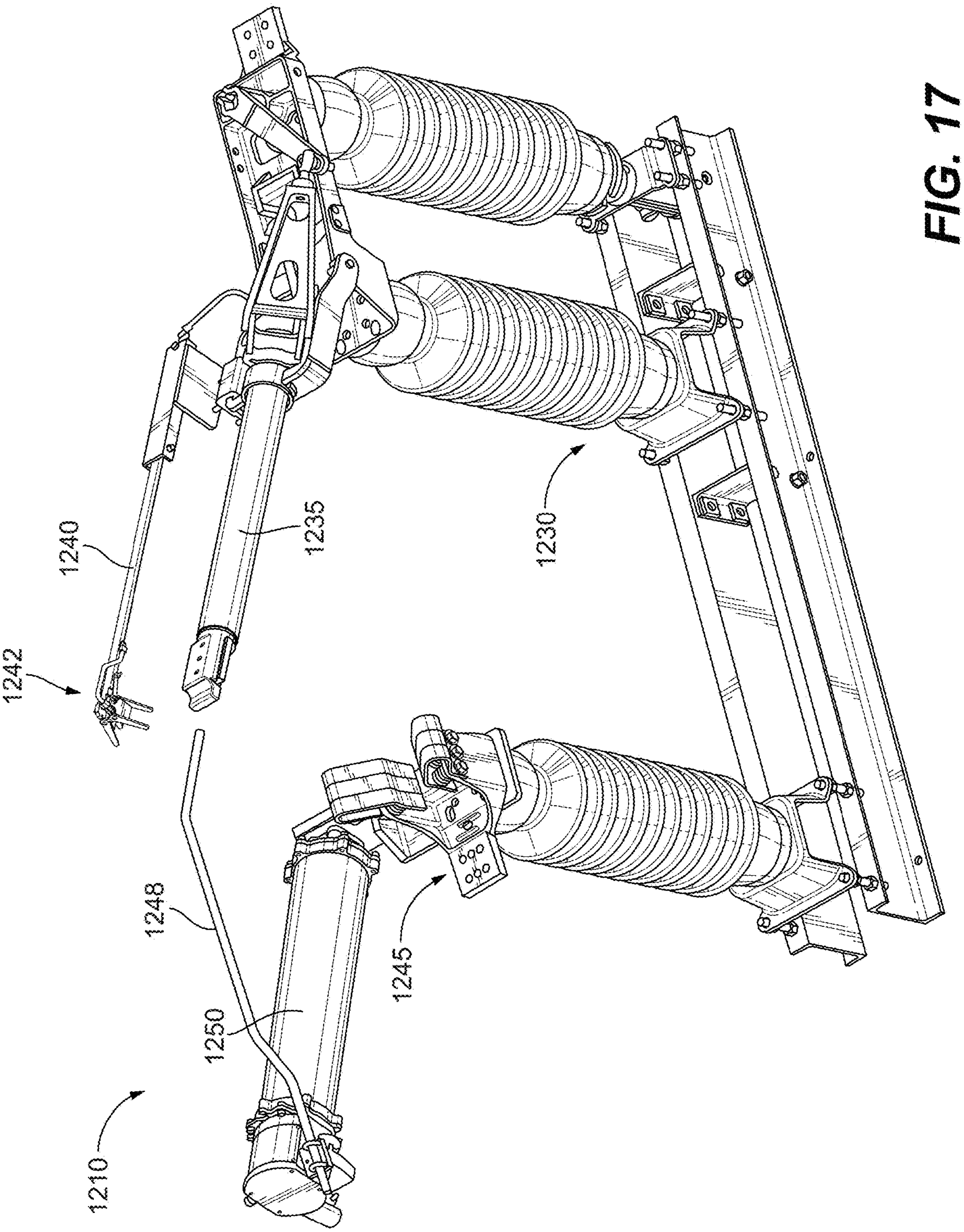
FIG. 17 is a perspective view of the switch of 12A-12D and 13A-13D in a third position according to some embodiments.

The switch 1210 may be further rotated to a second point, illustrated in FIG. 17. As the blade 1235 continues to rotate away from the second electrical terminal 1245, the rod receiving portion 1242 of the rod 1240 disengages from the vacuum interrupter rod 1248. All electrical contact between the first electrical terminal 130 and the second electrical terminal 145 breaks at this point. Additionally, since the vacuum interrupter 1250 is now in an open state, electrical arcing does not occur outside of the vacuum interrupter 1250. In some embodiments, an electrical arc is extinguished prior to the rod receiving portion 1242 disengaging the vacuum interrupter rod 1248.

Thus, the application provides, among other things, a system and method for operating an electrical switch between a closed position and an open position. Various features and advantages of the application are set forth in the following claims.

What is claimed is:

1. A vacuum interrupter configured to be removable coupled to a switch having a first electrical terminal and a second electrical terminal, wherein the vacuum interrupter is removably coupled to the second electrical terminal, the vacuum interrupter comprising:

a rod contact configured to receive a rod coupled to the first electrical terminal, wherein the rod is spring loaded in an axial direction, and wherein the rod includes a first portion and a second portion substantially perpendicular to the first portion, the second portion received by the rod contact;

wherein when closing the switch, the rod contact engages the rod and arcing is prevented.

2. The vacuum interrupter of claim 1, wherein the rod contact engaging the rod places the vacuum interrupter in a closed state before the switch enters a closed switch state.

3. The vacuum interrupter of claim 1, wherein the first portion is substantially parallel with the axial direction and the second portion is substantially perpendicular with the axial direction.

* * * * *